United States Patent [19]

Komatsu et al.

[11] Patent Number: 4,646,134
[45] Date of Patent: Feb. 24, 1987

[54] APPARATUS FOR ENCODING IMAGE SIGNAL

[75] Inventors: Kousuke Komatsu; Tsutomu Miyauchi; Ikuo Misao, all of Kanagawa; Mutsumi Kimura; Tadashi Fujiwara, both of Tokyo; Yoshio Tsuchida; Junko Kuroiwa, both of Kanagawa, all of Japan

[73] Assignee: Sony Corporation, Tokyo, Japan

[21] Appl. No.: 713,612

[22] Filed: Mar. 19, 1985

[30] Foreign Application Priority Data

Mar. 21, 1984 [JP] Japan ................... 59-53961
Apr. 14, 1984 [JP] Japan ................... 59-75371
Apr. 28, 1984 [JP] Japan ................... 59-87404

[51] Int. Cl.$^4$ ............... H04N 11/02; H04N 11/04; H04N 11/20
[52] U.S. Cl. ................... 358/11; 358/80; 358/263; 364/521; 382/9
[58] Field of Search ........... 358/263, 11, 12, 21 R, 358/22, 78, 80; 382/9, 56; 364/521

[56] References Cited

U.S. PATENT DOCUMENTS

| | | | |
|---|---|---|---|
| 3,980,809 | 9/1976 | Cook | 358/263 |
| 4,334,274 | 6/1982 | Agui | 382/9 |
| 4,516,155 | 5/1985 | Hennig | 358/80 |
| 4,538,182 | 8/1985 | Saito | 358/80 |
| 4,577,219 | 3/1986 | Klie | 358/80 |

OTHER PUBLICATIONS

*BYTE* Magazine, Jul. 1983, pp. 82–84, 86, 88, 90 and 92, "NAPLPS Standard Graphics and the Microcomputer".

*Primary Examiner*—Howard W. Britton
*Attorney, Agent, or Firm*—Lewis H. Eslinger; Alvin Sinderbrand

[57] ABSTRACT

An image signal encoding system wherein image signal is directly taken in through video camera, changed to digital data, broken down into PDI basic patterns, and then converted into NAPLPS code automatically. The taken-in image signal is divided into a plurality of areas and the information amount of the image signal is reduced for adequate encoding after taking in the image signal. Usually "POLYGON" command is used as the NAPLPS code.

13 Claims, 66 Drawing Figures

| FIG.2(A) | FIG.2(B) |
|---|---|

FIG. 3
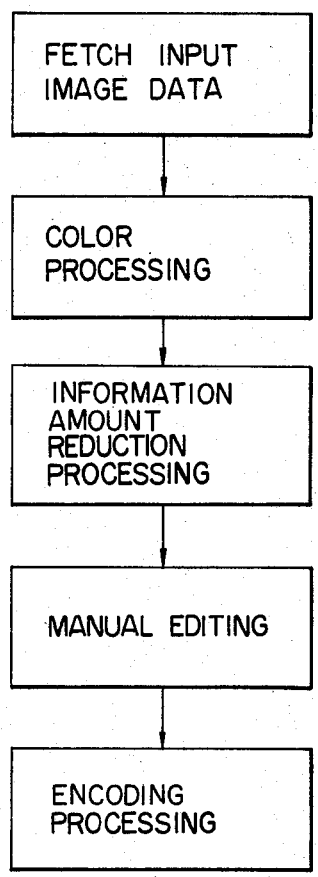
FIG. 4
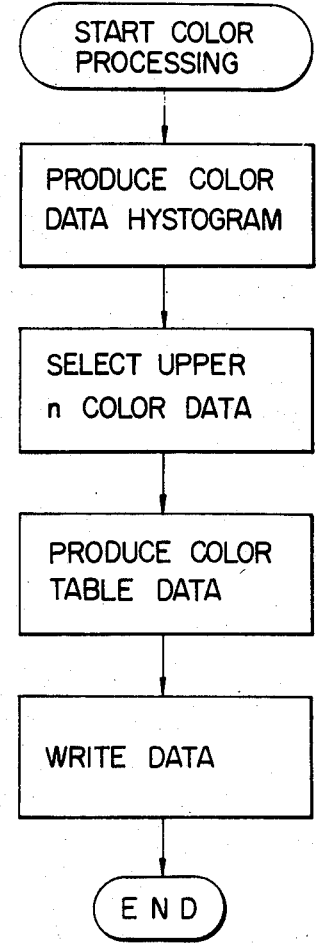
FIG. 5
| A | B | C |
|---|---|---|
| D | E | F |
| G | H | I |

FIG. 10

| ORIGINAL COLOR DATA | TEXTURE DATA | | |
|---|---|---|---|
| Dc [R G B] | DcF [R G B] | DcB [R G B] | DTX |
| 0 0 0 | 0 0 0 | — | 0 |
| 0 0 1 | 0 0 0 | 0 0 2 | 1 |
| 0 0 2 | 0 0 2 | — | 1 |
| 0 1 0 | 0 0 0 | 0 2 0 | 1 |
| 0 1 1 | 0 0 0 | 0 2 2 | 1 |
| 0 1 2 | 0 0 2 | 0 2 2 | 1 |
| 0 2 0 | 0 2 0 | — | 0 |
| 0 2 1 | 0 2 0 | 0 2 2 | 1 |
| 0 2 2 | 0 2 2 | — | 0 |
| 1 0 0 | 0 0 0 | 2 0 0 | 1 |
| 1 0 1 | 0 0 0 | 2 0 2 | 1 |
| 1 0 2 | 0 0 2 | 2 0 2 | 1 |
| 1 1 0 | 0 0 0 | 2 2 0 | 1 |
| 1 1 1 | 0 0 0 | 2 2 2 | 1 |
| 1 1 2 | 0 0 2 | 2 2 2 | 1 |
| 1 2 0 | 0 2 0 | 2 2 0 | 1 |
| 1 2 1 | 0 2 0 | 2 2 2 | 1 |
| 1 2 2 | 0 2 2 | 2 2 2 | 1 |
| 2 0 0 | 2 0 0 | — | 0 |
| 2 0 1 | 2 0 0 | 2 0 2 | 1 |
| 2 0 2 | 2 0 2 | — | 0 |
| 2 1 0 | 2 0 0 | 2 2 0 | 1 |
| 2 1 1 | 2 0 0 | 2 2 2 | 1 |
| 2 1 2 | 2 0 2 | 2 2 2 | 1 |
| 2 2 0 | 2 2 0 | — | 0 |
| 2 2 1 | 2 2 0 | 2 2 2 | 1 |
| 2 2 2 | 2 2 2 | — | 0 |

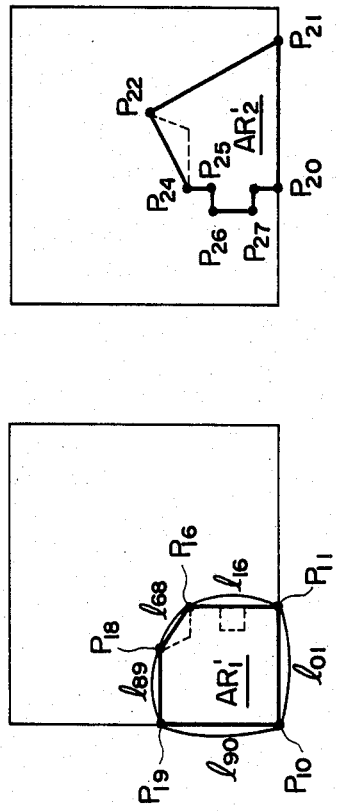
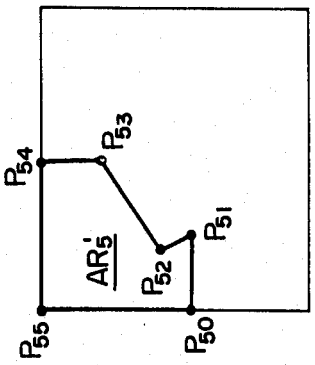
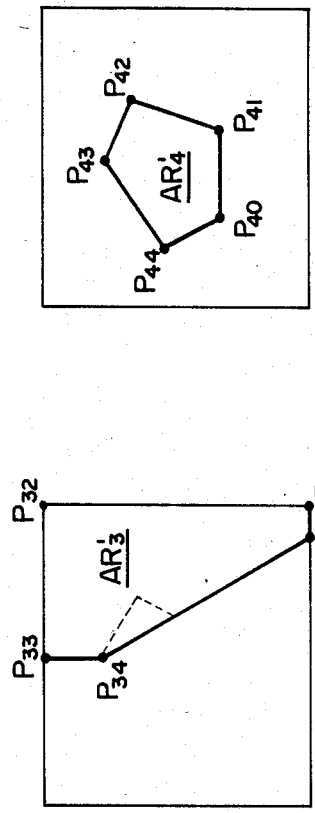

FIG. 23(A)
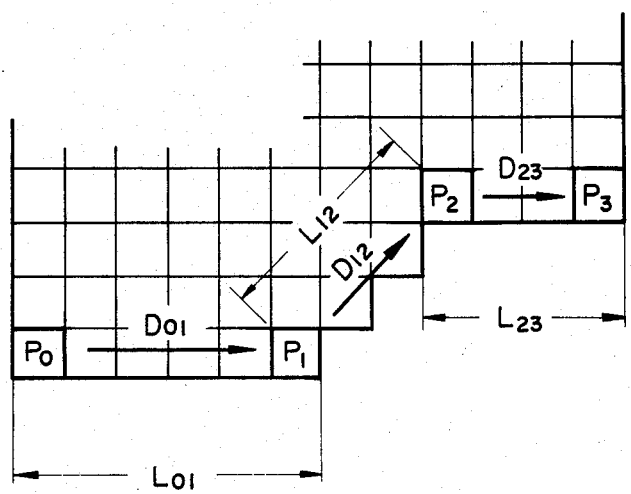
FIG. 23(B)
| A(P₀) | D₀₁ | L₀₁ | A(P₁) | D₁₂ | L₁₂ | A(P₂) | D₂₃ | L₂₃ | A(P₃) |
FIG. 24    FIG. 25(A)
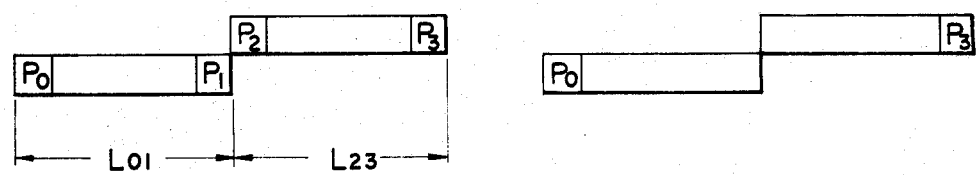
FIG. 25(B)

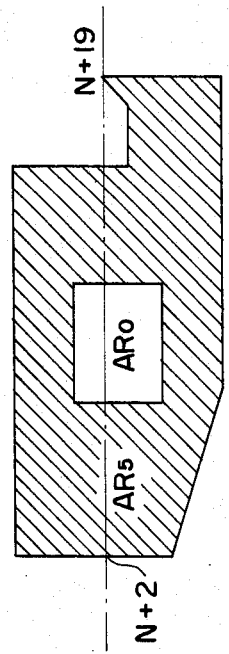
F I G. 34
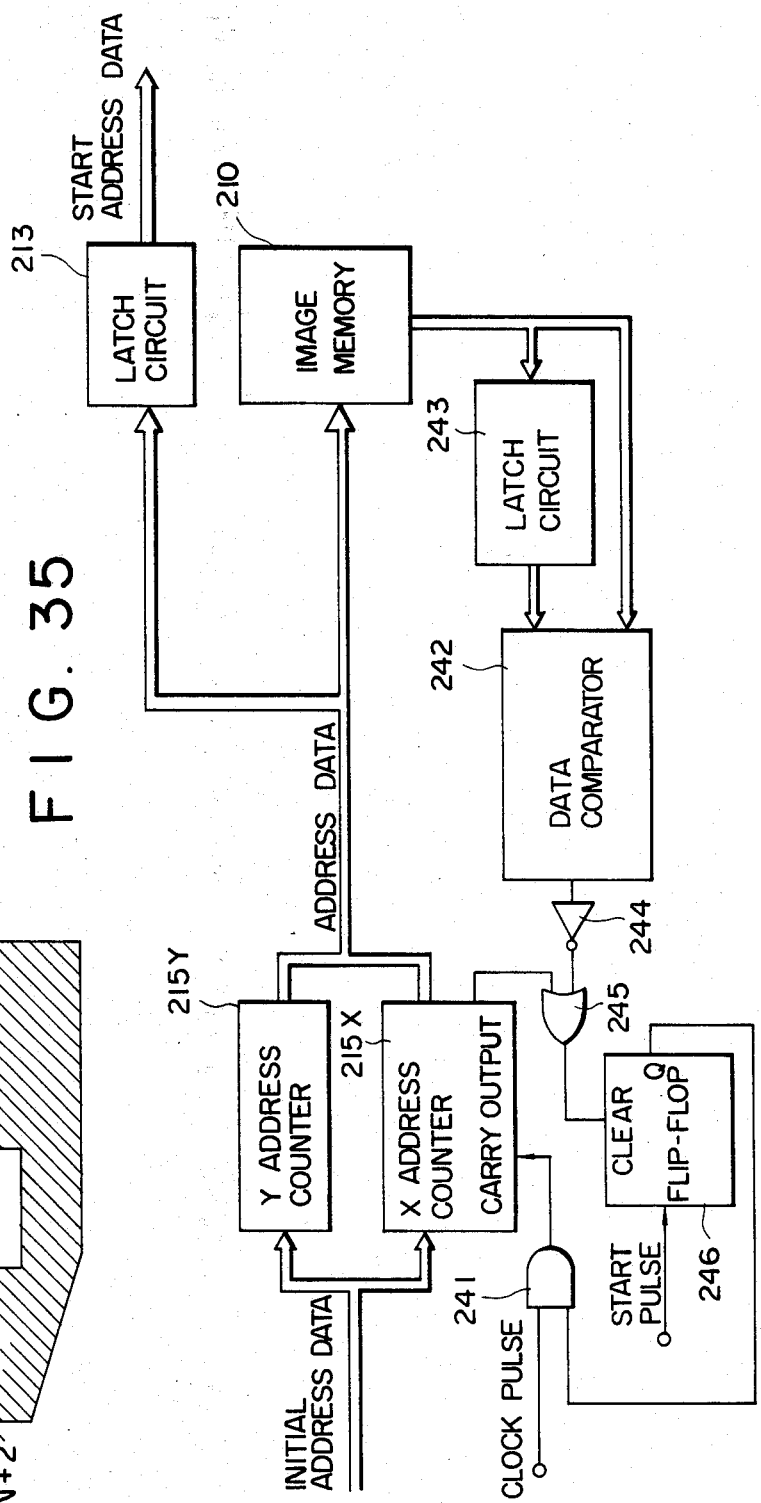
F I G. 35

APPARATUS FOR ENCODING IMAGE SIGNAL

BACKGROUND OF THE INVENTION

1. Field of the Invention

This invention relates to a signal processing apparatus used for digital image information transmitting systems for transmitting various image information such as videotex or teletext information by utilizing telephone circuits or radio channels and, more particularly, to an apparatus for encoding an image signal, wherein one image frame is handled as an aggregate of geometric areas and image information of each geometric area is converted into geometric command data.

2. Description of the Prior Art

With the recent development of the information communication society, digital image information transmitting systems for transmitting videotex and teletext information have been developed and used in practice as new media of transmission of various image information in various countries. For example, a system called PRESTEL has already been in practical use in England. In Japan, a CAPTAIN (Character and Pattern Telephone Acess Information Network) system has been developed. Further, a TELETEL system in France and a NAPLPS (North American Presentation Leved Protocol Syntax) system in Canada and U.S.A. are going to be in practical use.

In the NAPLPS system, one image frame is handled as an aggregate of geometric areas and image ihformation is transmitted in the form of geometric command data based on PDI (Picture Description Instruction) codes. The high efficiency of the system is highly evaluated. In the PDI codes, the command data as "POINT", "LINE", "ARC", "RECTANGLE" and "POLYGON" are defined as geometric drawing commands. The command data "POINT" instructs setting a point of the start of a drawing or plotting a point Po at a given co-ordinate position on a display screen as shown in FIG. 1A. The command data "LINE" instructs drawing a line segment connecting two points $P_1$ and $P_2$ as shown in FIG. 1B. The command data "ARC" instructs drawing an arc on the basis of the co-ordinates of three points $P_1$, $P_2$ and $P_3$ as shown in FIG. 1C, and also drawing a chord connecting the two points $P_1$ and $P_3$ as shown by a phantom line and coloring the area enclosed by the arc and chord. The command data "RECTANGLE" instructs drawing a rectangle having a pair of diagonally located vertexes at points $P_1$ and $P_2$ as shown in FIG. 1D and coloring the area enclosed by the rectangle. The command data "POLYGON" instructs drawing a polygon having vertexes $P_1$, $P_2$, ..., Pn as shown in FIG. 1E and coloring the area enclosed by the polygon.

With the above digital image information transmitting system utilizing geometric command data, it is possible to greatly reduce the information amount of image information which is actually transmitted, thus permitting high efficiency information transmission. However, the operation of forming the geometric command data for image information, i.e., one frame of image, to be actually transmitted requires a great deal of time and labor.

For example, the conversion of a video signal obtained by picking up an image to be transmitted into the geometric command data may be carried out by an operator by scrupulously providing contour information and color hue and gradation information using tablets while watching a monitor television receiver so that the input information is progressively converted to the geometric command data. In such a method, however, it is difficult to properly and accurately express the information of the original image, and also a great deal of time and labor is necessary for providing various kinds of information.

OBJECT OF THE INVENTION

An object of the present invention is to provide an apparatus for encoding an image signal, in which one frame of an image is handled as an aggregate of an geometric areas to transmit image information as geometric command data, and which permits automation of the conversion of the image information into the geometric command data so that the geometric command data for each of the geometric areas of the image to be transmitted can be automatically produced properly, accurately and in a short period of time.

Another object of the present invention is to provide, in the afore-mentioned image signal encoding apparatus, in which one frame of image is handled as an aggregate of geometric areas to transmit image information as gemetric command data, a boundary detector, which can detect the boundary between adjacent geometric areas of the image to be transmitted accurately and in a short period of time.

A further object of the present invention is to provide, in the afore-mentioned image signal encoding apparatus, an image area processor, which can perform a data processing of replacing image data of a designated image area with other image data efficiently and in a short period of time, thus facilitating the editing of transmission data in a digital image information transmitting system as noted above.

SUMMARY OF THE INVENTION

To attain the above objects, there is provided an apparatus for encoding an image signal according to the present invention, which comprises image memory means for taking in image data obtained by picking up an image, image area detecting means for detecting image areas of the image that are represented by the same image data, data processing means for removing redundant data in the image data, and geometric command data generating means for generating geometric command data representing respective areas of the image as geometric contours, whereby the geometric command data for each area of the image is obtained from area data obtained through the area detection with respect to image data read out from the image memory means and image data obtained through the redundant data removal processing.

BRIEF DESCRIPTION OF THE DRAWINGS

FIG. 3 is a flow chart illustrating an image processing routine in the same embodiment;

FIG. 4 is a flow chart illustrating a color processing routine in the same embodiment;

FIG. 5 is a schematic view showing a picture element group as a subject of processing for explaining an information amount reduction processing in the same embodiment;

FIGS. 6 to 10 are schematic views for explaining color designation in a coding processing in the same embodiment, in which:

FIG. 6 is a view showing an image area as a subject of processing;

FIG. 7 is a view showing embodiments of texture pattern;

FIG. 8 is a view showing embodiments of color designation for the image area shown in FIG. 6 with the texture patterns shown in FIG. 7;

FIG. 9 is a view showing the principles underlying a color designation operation in a case when 3-level color data is converted to 2-level color data; and FIG. 10 is a view showing an embodiment of texture data used for color designation of 27 colors under the color designation operation principles;

FIGS. 11 to 18 illustrate an example of the boundary detection circuit in the above embodiment, in which:

FIG. 11 is a block diagram showing the construction of the boundary detection circuit;

FIG. 12 is a time chart illustrating the operation of the boundary detection circuit;

FIG. 13 is a schematic view showing a picture element group as a subject of a boundary detection operation;

FIG. 14 is a schematic view illustrating direction of continuity of boundary with respect to a picture element as a subject of detection and content of image data of the picture elements in the group;

FIG. 15 is a schematic view illustrating the principles underlying the determination of direction of boundary detection in the initial stage of boundary detection operation;

FIG. 17 is a block diagram showing an essential part of a modification of the boundary detection circuit shown in FIG. 11; and FIGS. 18(A) and 18(B) are schematic views showing direction data preliminarily written in a direction ROM in the modification shown in FIG. 17;

FIGS. 20 to 22 are schematic views for explaining the principles underlying the encoding processing, in which:

FIG. 20 is a view showing image areas of an original image;

FIG. 21 is a view showing an unencoded image area first detected in the encoding processing; and FIGS. 22(A) to 22(E) are views showing embodiments of the encoded image area actually obtained by the encoding processing;

FIGS. 23 to FIG. 29 are schematic views for explaining an operation of producing a data table for encoding processing according to direction data obtained from the boundary detection circuit in the above embodiment, in which:

FIG. 23(A) is a view showing a boundary between adjacent image areas detected by the boundary detection circuit;

FIG. 23(B) is a view showing a data table for the boundary of the image areas shown in FIG. 23(A);

FIG. 24 is a view showing a different embodiment of the boundary detected by the boundary detection circuit;

FIG. 25(A) is a view showing vertexes necessary for encoding the boundary shown in FIG. 24;

FIG. 25(B) is a view showing a data table for the case of FIG. 25(A);

FIG. 26 is a view showing a further embodiment of the boundary;

FIG. 28 is a view showing a further embodiment of the boundary; and

FIGS. 31 to 38 are views showing a specific example of an image area processor employed in the above embodiment, in which:

FIG. 31 is a block diagram showing the construction of a boundary processing circuit;

FIG. 32 is a block diagram showing the construction of an image area processing circuit;

FIG. 33 is a time chart illustrating the operation of the image area processing circuit;

FIG. 34 is a schematic view showing an image area as a subject of processing;

FIG. 35 is a block diagram showing the construction of a start address detection circuit;

FIG. 37 is a view showing an image area as a subject of processing that contains an enclosed other area; and FIG. 38 is a block diagram showing the construction of a determination circuit for determining a boundary between the subject image area and other image area.

DETAILED DESCRIPTION OF THE PREFERRED EMBODIMENTS

Now, an embodiment of the apparatus for encoding an image signal according to the present invention will be described in detail with reference to the drawings.

FIGS. 2 to 18 illustrate an embodiment of the present invention applied to an input data processing apparatus for a digital image information transmitting system based on the NAPLPS system. In this embodiment of the apparatus, either an RGB color signal obtained from a color image to be transmitted through a color video camera (not shown) or a color television signal of a standard television system (e.g., NTSC system) is taken in, and one frame of a color image represented by the taken-in signal is handled as an aggregate of geometrical areas to produce corresponding geometric command data, which are supplied to a microcomputer 100 via a data bus.

Figure 1A:
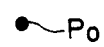
FIGS. 1(A) to 1(E) are views schematically illustrating processes of drawing according to PDI codes.
Figure 1B:
Figure 1C:
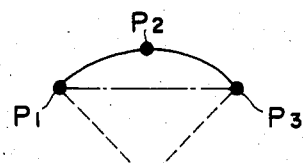
Figure 1D:
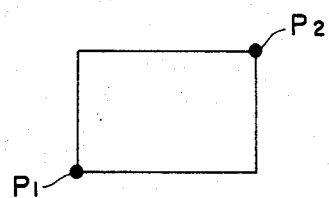
Figure 1E:
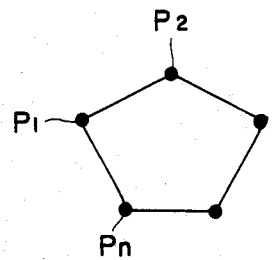
Figures 2, 2A:
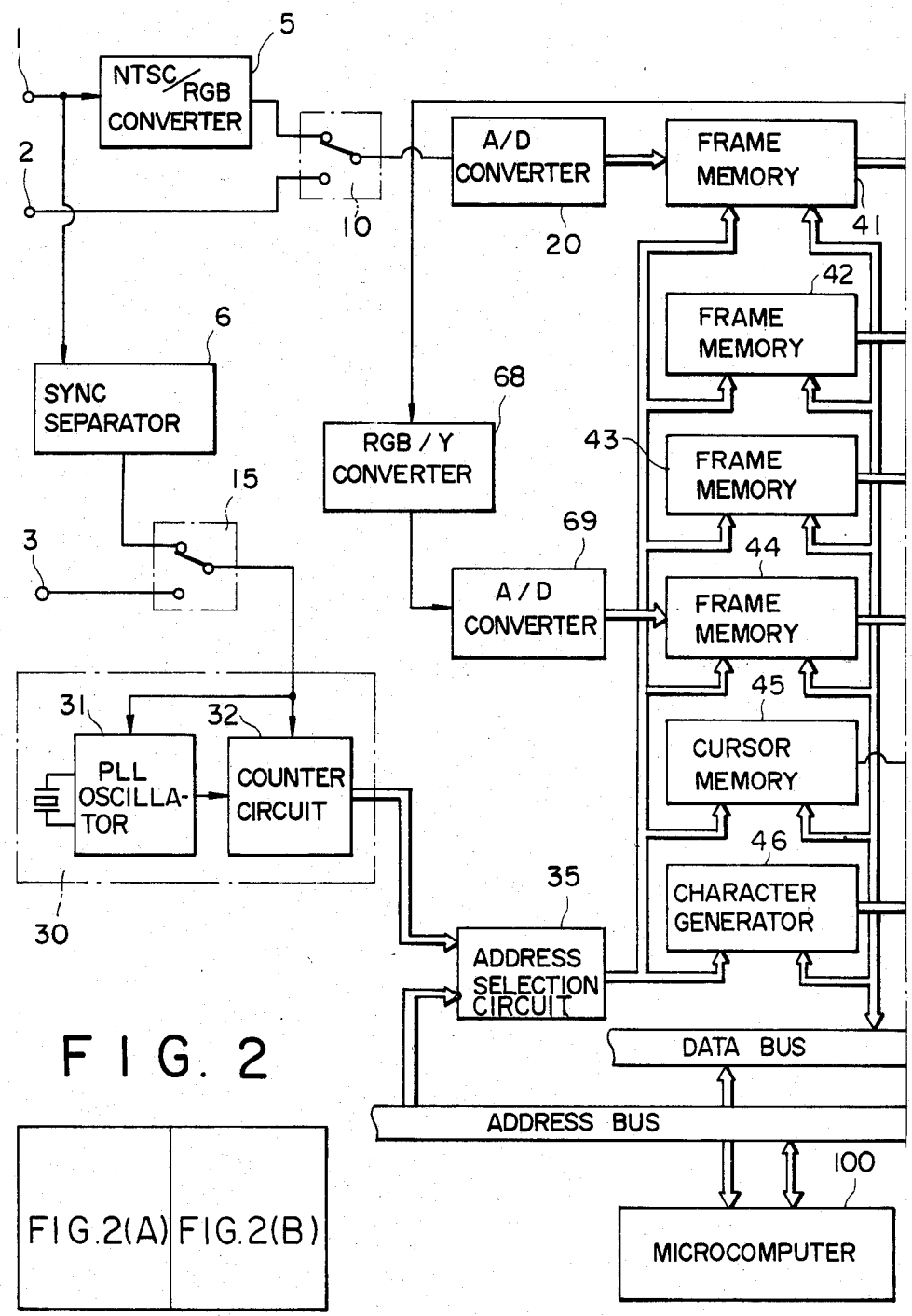
FIG. 2, consisting of FIGS. 2(A) and 2(B), are block diagrams showing an embodiment of the apparatus for encoding image signal according to the present invention.
Figure 2B:
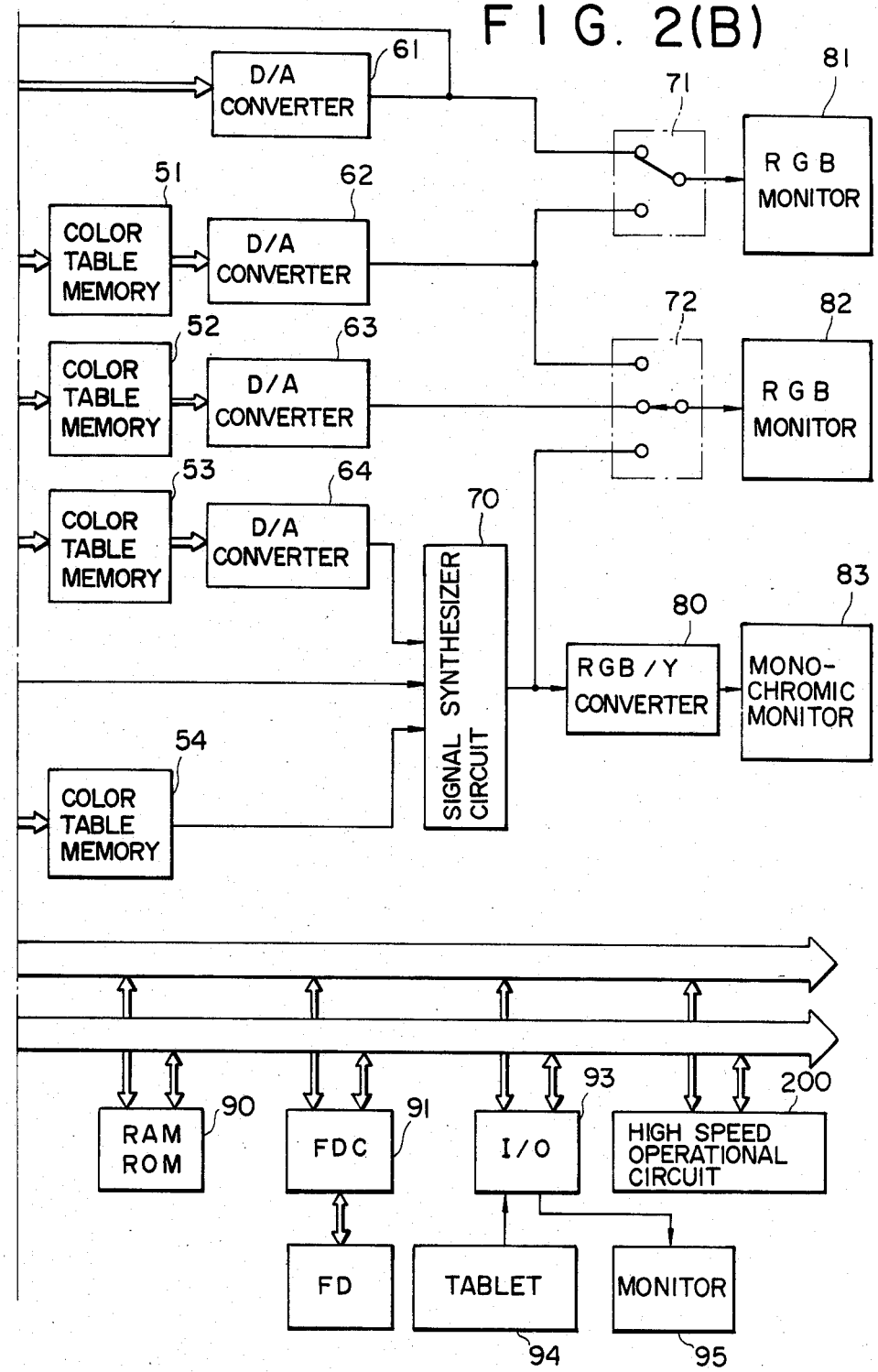

Referring to the block diagram of FIG. 2, showing the overall construction of the embodiment of the apparatus, an NTSC system color television signal, for instance, is supplied through a first signal input terminal 1 to an NTSC/RGB converter 5 and a sync separator 6. An RGB color signal is supplied through a second signal input terminal 2 to an input selection circuit 10.

The input selection circuit 10 selects an RGB color signal, which is obtained through conversion of the color television signal supplied from the first signal input terminal 1 through the NTSC/RGB converter 5, or an RGB color signal supplied from the second signal input terminal 2. The selected RGB color signal is supplied to an A/D (analog-to-digital) converter 20.

The sync separator 6 separates a sync signal from the color television signal supplied from the first signal input terminal 1, the separated sync signal being supplied to a sync switching circuit 15. A sync signal which corresponds to the RGB color signal supplied to the second signal input terminal 2 is supplied from a third signal input terminal 3, the sync switching circuit 15 carries out the selection interlocked with the input selection circuit 10, and is also supplied the sync signal corresponding to the RGB color signal supplied to the A/D converter 20 to an address data generator 30. The address data generator 30 includes a PLL oscillator 31 and a counter circuit 32. As the counter circuit 32 counts output pulses of the PLL oscillator 31, address data synchronized to the sync signal is produced, the address data being supplied to an address selection circuit 35.

The address selection circuit 35 selects either the address data supplied via the address bus from the microcomputer 100 or the address data supplied from the address data generator 30, the selected address data being supplied to first to fourth frame memories 41 to 44, a cursor memory 45 and a character generator 46. The frame memories 41 to 44, cursor memory 45 and character generator 46 are capable of feeding and receiving various data to and from the microcomputer 100 via the data bus.

In the first frame memory 41 is stored the original image data. More specifically, digital data produced through conversion of the RGB color signal in the A/D converter 20 is written for each of the three, i.e., R, G and B, colors in the first memory 41 under the control of the address data from the address data generator 30. The digital color image data stored in the first frame memory 41 can be read out at any time for being supplied to a D/A (digital-to-analog) converter 61 for conversion to recover the analog RGB color signal to be supplied through a first output selection circuit 71 to a first RGB monitor 81 for monitoring the original color image.

The second to fourth frame memories 42 to 44 are used as general-purpose memories for various data processing such as color processing and redundant data removal processing on the original image data stored in the first frame memory 41. Various image data in various processing steps described later in detail are written in and read out from these frame memories via the data bus. More specifically, processed image data, which is stored in the second frame memory 42, is supplied to a color table memory 51 for conversion to color data. The color data thus obtained is supplied to a D/A converter 62 for conversion to recover the analog RGB color signal to be supplied to first and second output selection circuits 71 and 72. Thus, a processed color image can be monitored on first or second RGB monitor 81 or 82. Processed image data, which is stored in the third frame memory 43, is supplied to a color table memory 52 for conversion to color data supplied to a D/A converter 63 for conversion to recover the analog RGB color signal to be supplied through the second output selection circuit 72 to the second RGB monitor 82, so that the processed color image can be monitored on the second RGB monitor 82. In the fourth frame memory 44 is written monochromic image data of the original image, which is obtained by converting the original image data stored in the first frame memory 41 through the D/A converter 61 to recover the analog RGB color signal, converting this signal through an RGB/Y converter to obtain a Y (luminance) signal and converting this Y signal through the A/D converter 69. Monochromic image data obtained through a redundant data removal processing on the stored monochromic image data, is converted through a color table memory 53 and the D/A converter 63 to recover the analog RGB color signal to be supplied to a signal synthesizer circuit 70.

To the signal synthesizer circuit 70 is also supplied a cursor signal from the cursor memory 45. The character generator 46 supplies character data for the display of various system control commands to a color table memory 54 for conversion to the analog RGB color signal, which is supplied to the signal synthesizer circuit 70. The signal synthesizer circuit 70 thus produces a complex RGB color signal which represents the result of synthesis of the image corresponding to the image data stored in the fourth frame memory 44, cursor image corresponding to the cursor signal from the cursor memory 45 and image corresponding to the character data from the character generator 46. The image corresponding to the complex RGB color signal obtained form the signal synthesizer circuit 70 can be monitored on the second RGB monitor 82. Also, the complex RGB color signal can be converted by an RGB/Y converter 80 to the Y signal for being monitored on a monochromic monitor 83.

In this embodiment, the microcomputer 100 serves as a controller for controlling the operations of the entire apparatus, and it is interconnected via the data bus and address bus with an auxiliary memory 90 including RAMs and ROMs, a floppy disk controller 91, an input-/output interface circuit 93 and a high speed operational circuit 200. To the input/output interface circuit 93 are connected a tablet 94 for providing various data for manual editing and monitor 95 therefor.

In this embodiment, an image is processed in the manner as shown in the flow chart of FIG. 3, whereby input color image data supplied through the A/D converter 20 to the first frame memory 41 is converted to the geometric command data which is supplied via the data bus.

More specifically, the input color image data is first written in the first frame memory 41 to be stored as original image data. For the input color image data, either NTSC color television signal or RGB color signal can be selected by switching the input selection circuit 10 and sync selection circuit 15. The original image data stored in the first frame memory 41 is converted by the RGB/Y converter 68 to the monochromic image data which is stored in the fourth frame memory 44.

Subsequently, color processing on the input color image data is done according to the image data stored in the first and fourth frame memories 41 and 44. Then, the redundant data removal processing is done to automatically obtain image data which is suited for conversion to the geometric command data without losing the features of the original image.

Finally, the geometric command data is automatically obtained from the image data.

When editing artificially the original image to be transmitted, a manual editing processing is done before the conversion of the image data to the geometric command data.

The color processing is done in the manner as shown in the flow chart of FIG. 4. More specifically, of the original color image which is represented by the input color image data stored in the first frame memory 41, n different colors in the order of higher frequencies of appearance are automatically selected, and one of the n different colors is alloted to each picture element.

When the color processing is started, the high speed operational circuit 200 produces hystograms for the individual color data according to the input color image data stored in the first frame memory 41. Then the upper order n color data of the hystograms are selected. Then color table data are produced in the order of higher luminance values by allotting n different colors closest to the color of the original color image to each image area shown by the same luminance of the monochromic image shown by the monochromic image data stored in the fourth frame memory 44. The color table data is then corrected such that the deviation of color is minimum for each picture element. The color table data produced in the above way by the high speed operational circuit 200 is stored in the color table memories 51 to 53. Also, the color processed image data which is obtained by allotting the n different colors to each image area is written in the second frame memory 42.

The color processed color image can be monitored on the first or second RGB monitor 81 or 82 by reading each color data from the first color table memory 41 by using as address data the image data stored in the second frame memory 42.

In the redundant data removal processing, such processings as noise cancellation processing, intermediate tone removal processing and small area removal processing are done on the image data stored in the second and fourth frame memories 42 and 44. In this way, the redundant data that are unnecessary for the subsequent encoding processing to obtain the geometric command data are removed to reduce the amount of information dealt with.

The redundant data removal processing is undertaken by the high speed operational circuit 200. For example, considering 3 by 3, i.e., 9, picture elements A to I as shown in FIG. 5, if three or more picture elements amoung the picture elements B, D, F and H adjacent to the center picture element E are represented by the same data, the noise cancellation is done by replacing the value of this data with the data of the center picture element E. If two or more of the picture element rows "A·E·I", "B·E·H", "C·E·G" and "D·E·F" concerning the center picture element E are represented by data of monotonously increasing values or monotonously decreasing values, the data of the eight picture elements closest to the center picture element E are replaced with the data of the center picture element E as intermediate tone picture element, thereby effecting the intermediate tone removal. The small area removal is effected by adding small area less than a designated area to adjacent areas. The processed image data that is obtained after the redundant data removal processing in the high speed operational circuit 200 is read into the third frame memory 43 to be supplied through the second color table memory 52 to the second RGB monitor 82 for monitoring.

In the manual editing processing, addition of a new motive, deletion of a motive, correction of color or the like are done on the color image represented by the image data which is obtained automatically after the color processing and redundant data removal processing.

The manual editing is carried out using the transparent tablet 94 which is provided on the screen of the monochromic monitor 83 for monitoring the monochromic image data stored in the fourth memory 44.

On the screen of the monochromic monitor 83 are displayed character image representing various control commands necessary for the manual editing, which are provided from the character generator 46, and cursor image representing cursors as position data generated from the tablet 94, which are provided from the cursor memory 45. When the operator makes a correction of the image using a pen provided in the tablet 94, the result is displayed in real time.

In the encoding processing to obtain the geometric command data, the geometric command data for each of individual geometric areas of the image represented by the various processed color image data noted above, is formed in the following way.

First, the boundary between adjacent geometric image areas is followed to detect the position coordinates of each vertex. The detected position coordinates are regarded as representing the positions of vertexes of a geometrical contour (e.g., a polygon) and are converted to the geometric command data, e.g., data "POLYGON", which is based on the PDI codes noted above. Further, command data "CONTROL" corresponding to the color determined by the color processing noted above, is produced for each image area defined by the geometric contour connecting the vertexes.

Figure 6:
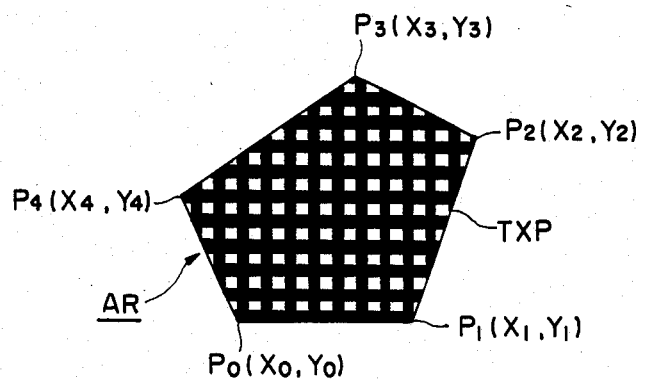
Figure 7:
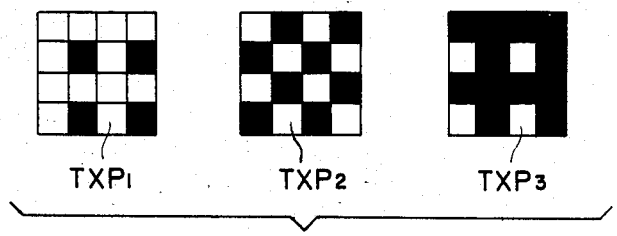
Figure 8:
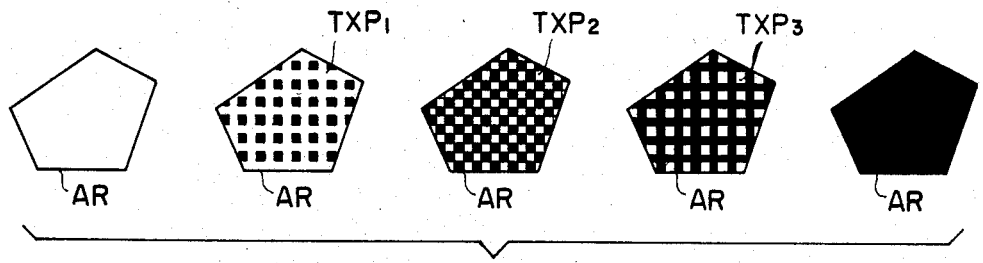

For example, when obtaining the command data based on PDI codes for an area AR defined by vertexes $P_0$ to $P_4$ as shown in FIG. 6, the color designation for the area AR is done by the combination of texture pattern TXP and color hue thereof. First, the coordinates $(X_0, Y_0)$ to $(X_4, Y_4)$ of the vertexes $P_0$ to $P_4$ and back color are encoded. Then, foreground color and co-ordinates $(X_0, Y_0)$ to $(X_4, Y_4)$ are encoded again by designating the texture pattern TXP, thereby completing the encoding of the area AR. As the texture pattern TXP, three different patterns $TXP_1$ to $TXP_3$ as shown in FIG. 7, for instance, are selectively designated, and the foreground color thereof is selectively designated from two colors, i.e., black and white. Doing so permits color designation in five gradations for the area AR as shown in FIG. 8. Denoting the number of texture patterns TXP between the two different colors by $m_p$ and the number of different colors by $n_p$, it is possible to approximately represent $N_p$ different colors expressed as $$N_p = n_p + \frac{n_p(n_p - 1)}{2} \times m_p$$

Figure 9:
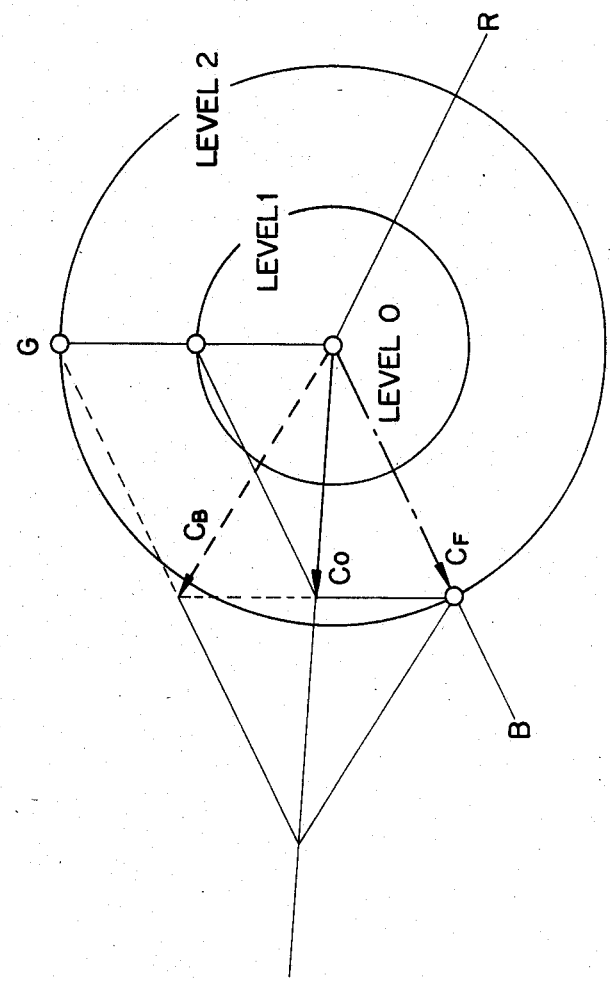

A specific example of the color designation for each image area in this embodiment, will now be described. To simplify the description, it is assumed that each of the colors R, G and B have three levels so that the color hue of the original image is represented by color data for $3^3=27$ different colors. For synthesizing a color hue $C_o$ where the levels of the component colors R, G and B are "0, 1, 2" as shown in FIG. 9 with $2^3=8$ different colors, consisting of two different levels of each of the colors R, G and B, a color hue $C_B$ shown by a dashed arrow, where the levels of R, G and B are "0, 2, 2" and color hue $C_F$ shown by a phantom line arrow, where the R, G and B levels are "0, 0, 2" may be mixed in proportions of 1:1. In other words, a lattice-like texture pattern with $C_B(0, 2, 2)$ as the foreground color and $C_F(0, 0, 2)$ as the background color, may be used. Color designation among 27 different colors, thus can be done by reading out texture data as shown in FIG. 10 from the texture memory using the color data $D_C(R, G, B)$ of the input color image data that represents the color hues of the original image. The texture data consists of foreground color designation data $D_{CF}(R, G, B)$, background color designation data $D_{CB}(R, G, B)$ and texture designation data $D_{TX}$. The texture designation data $D_{TX}$ specifies the color designation in the foreground colors alone when it is "0" and specifies designation of a lattice-like texture pattern when it is "1".

Figure 11:
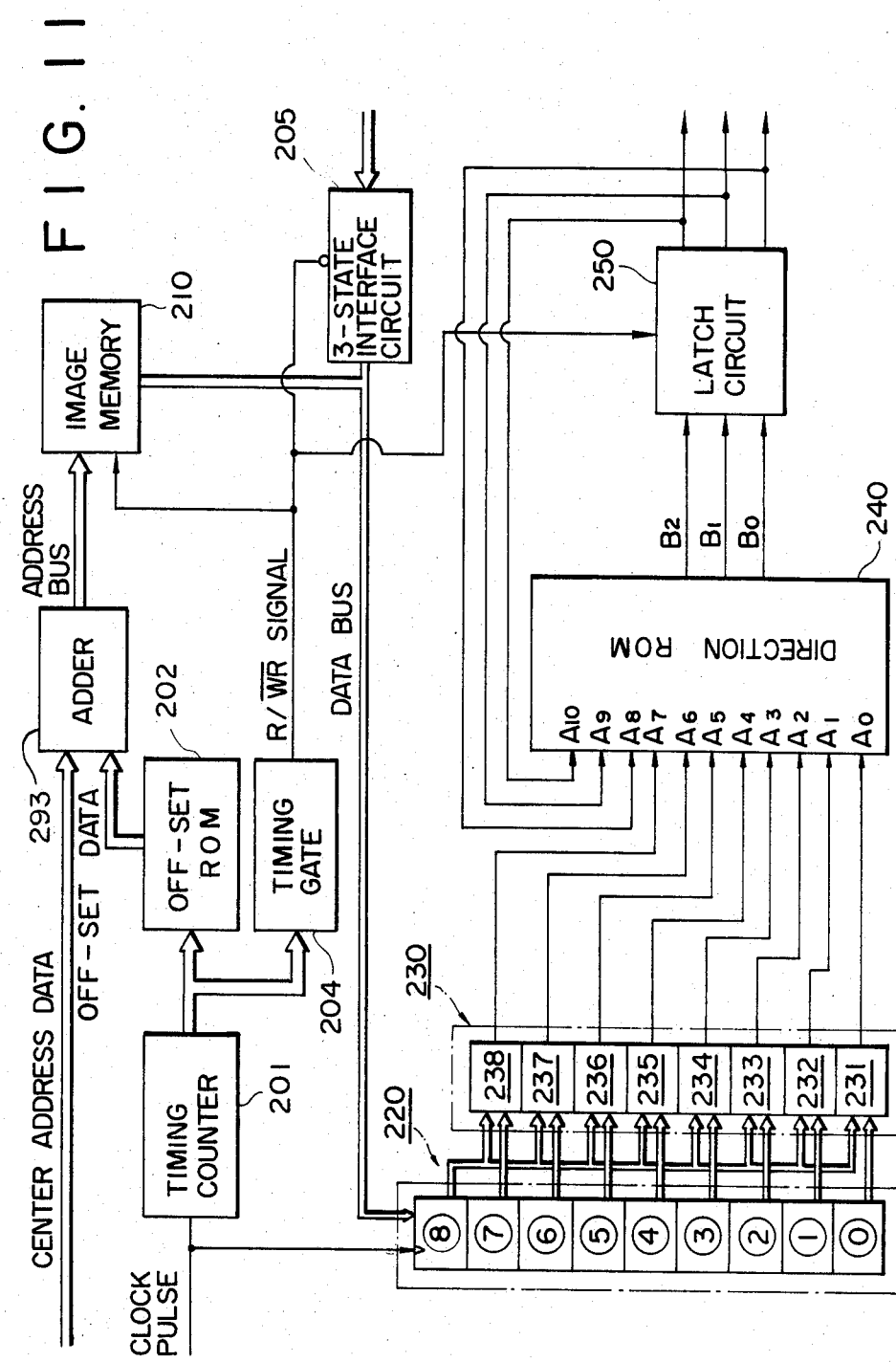

The determination of each image area may be done using a boundary detection circuit, which is provided in the high speed operational circuit 200 and has a construction as shown in FIG. 11, for instance.

Referring to FIG. 11, image data for one frame with n bits for one picture element of the image to be processed is stored in an image memory 210. The image memory 210 consists of an RAM of a suitable size capable of random accessing. Address data from an adder 203 is supplied to the image memory 210 via an address bus. The adder 203 produces the address data by adding off-set data read out from an off-set ROM 202 addressed by the count output of a timing counter 201 counting clock pulses supplied from the microcomputer 100 and center address data supplied therefrom. The output of the timing counter 201 is also supplied to a timing gate 204, which provides an R/$\overline{\text{WR}}$ signal supplied to the image memory 210 via a write/read control signal line.

Figure 12:
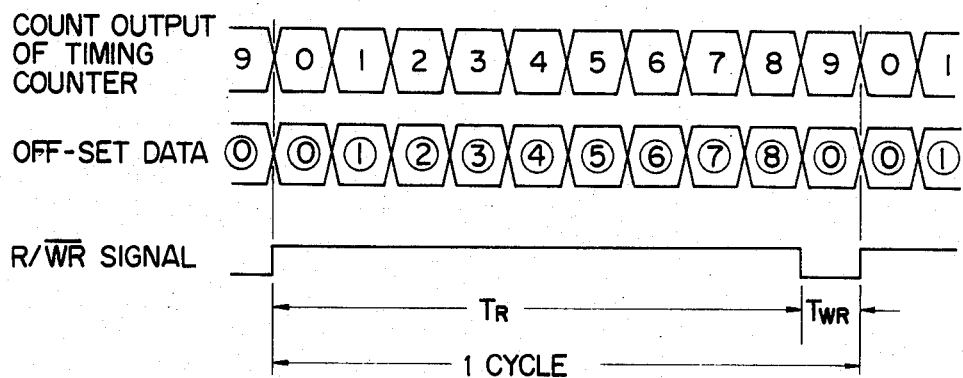
Figure 13:
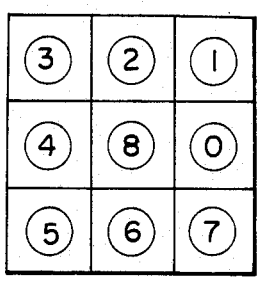

The timing counter 201 which counts the clock pulses noted above, supplies a decimal count output [0], [1]. . . [9] as shown in the time chart of FIG. 12, to the off-set ROM 20 and timing gate 204. Off-set data [⓪], [①], [②] . . . [⑦], [⑧], [⓪] are written in the off-set ROM 202 in addresses thereof designated by the count output [⓪],[①] . . . [⑨]. The off-set data [⓪], [①], [②] . . . [⑦], [⑧], [⓪] respectively correspond to the nine picture elements ⓪, ①, ② . . . ⑦, ⑧ in a three-row three-column matrix as shown in FIG. 13. The timing gate 204 decodes the count [0], [1] . . . [9] to produce the R/$\overline{\text{WR}}$ signal, which is logic "1" representing a write period $T_R$ when the count output is [0] to [8] and is logic "0" representing a read period $T_{WR}$ when the count output is [9]. The adder 203 adds the off-set address data and center address data to produce address data for sequenetially designating the data of eight picture elements ⓪, ① . . . ⑦ closest to the center picture element ⑧, which is designated by the center address data as a subject picture element for detection, and also the data of this center picture element ⑧ in one cycle period.

The image data sequentially read out from the image memory 210 is supplied to an n-bit 9-stage shift register 220 via the data bus. The shift register 220 sequentially shifts the image data according to clock pulses noted above, whereby the image data of the nine picture elements ⓪, ①, ⑧ in the 3-by-3 matrix noted above is temporarily stored in the shift register 220.

The image data temporarily stored in the shift register 220 is supplied to a data comparator circuit 230, in which the image data of the center picture element ⑧, i.e., subject picture element for the detection, is compared to the image data of the eight closest picture elements ⓪, ① . . . ⑦. The data comparator circuit 230 consists of eight n-bit comparators 231 to 238 and provides output data representing the coincidence of compared image data as read address data to a direction ROM 240.

In the direction ROM 240 is stored in advance direction data representing the direction of continuity of the boundary between adjacent image areas. The direction data can be read out as boundary detection data from the direction ROM 240 to a latch circuit 250. The latch circuit 250 is supplied with the R/$\overline{\text{WR}}$ signal as latch clock from the timing gate 204, and it latches the direction data at the timing of falling of the R/$\overline{\text{WR}}$ signal, i.e., at the timing when the image data of all the picture elements ⓪, ① . . . ⑧ are temporarily stored in the shift register 220. The boundary detection output, i.e., direction data, provided from the latch circuit 250 is supplied as address data to the direction ROM 240.

Figure 14:
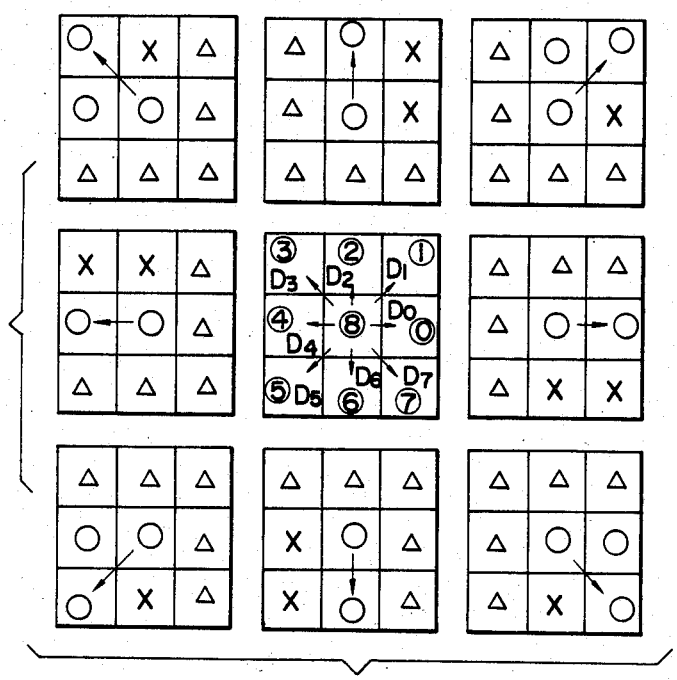

When the center picture element ⑧ is a detection subject picture element, the direction of continuity of the boundary with respect to the image consisting of the center picture element ⑧ and eight picture elements ⓪, ① . . . ⑦ closest thereto can be absolutely determined by eight different direction data $D_0$ [→], $D_1$ [↗], $D_2$ [↑] . . . $D_7$ [↘] as shown in FIG. 14. When the detection of the continuity of the boundary of image with respect to the center picture element ⑧ is done for the eight closest picture elements ⓪, ① . . . ⑦ in the counterclockwise direction, the direction data $D_0$ to $D_7$ are determined absolutely by the image data of four picture elements other than the picture elements ⓪, ① . . . ⑧ provided the data of the picture elements ⓪ to ⑧ are shown in FIG. 14. In other words, the data of the four other picture elements are determined absolutely with respect to the direction data $D_0$ to $D_7$. In FIG. 14, the circle mark indicates coincident image data, and the cross mark indicates non-coincident image data.

When the continuous boundary of the image is subsequently followed in the counterclockwise direction, the direction data can be determined absolutely from the direction data obtained in the previous detection operation cycle and also from whether the data of the prevailing detection subject picture element, i.e., center picture element ⑧, is coincident or non-coincident with the data of each of the eight closest picture elements ⓪, ① . . . ⑦.

Figure 15:
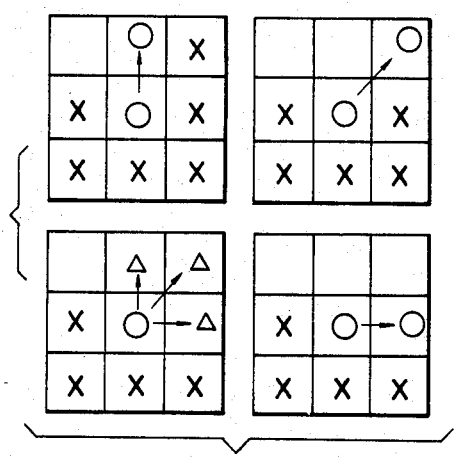
Figure 16A:
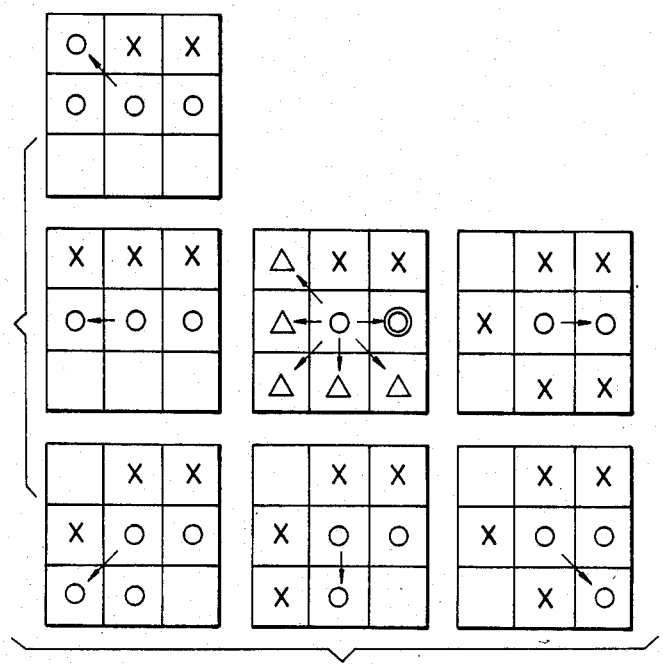
FIGS. 16(A) to 16(H) are schematic views showing the content of image data of the picture elements in the group and direction of boundary detection when progressively determining the direction of continuity of boundary.
Figure 16B:
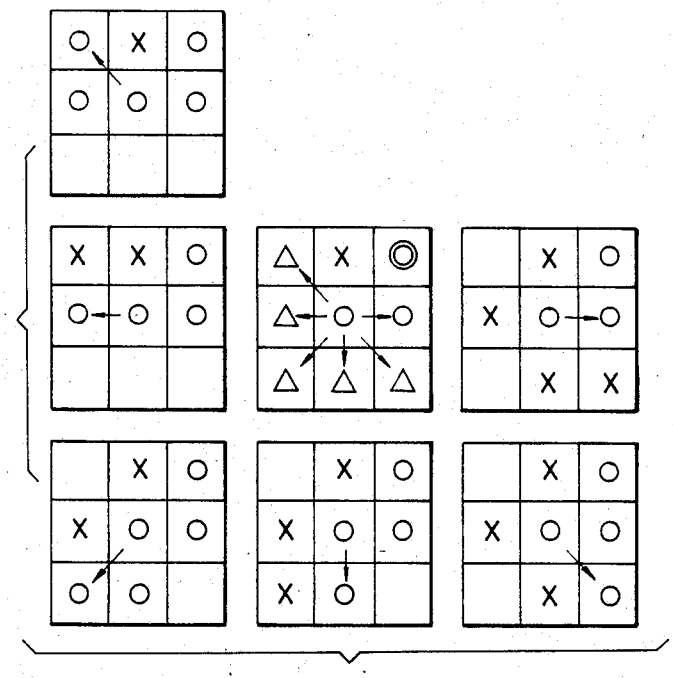
Figure 16C:
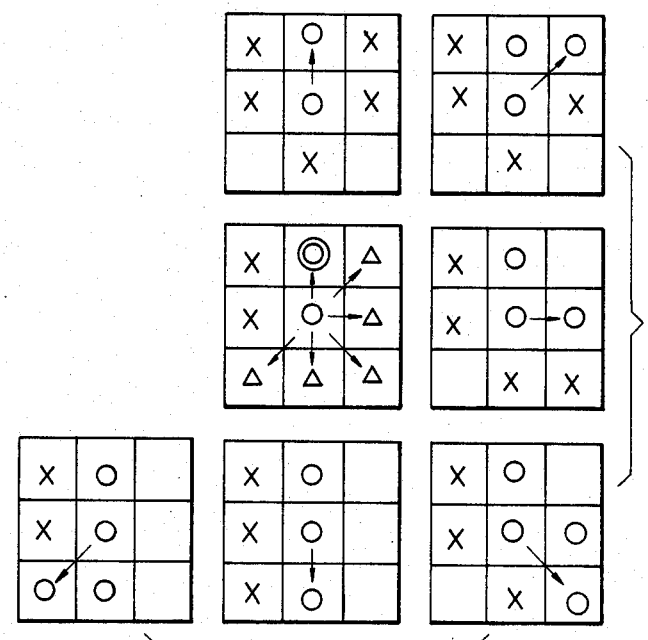
Figure 16D:
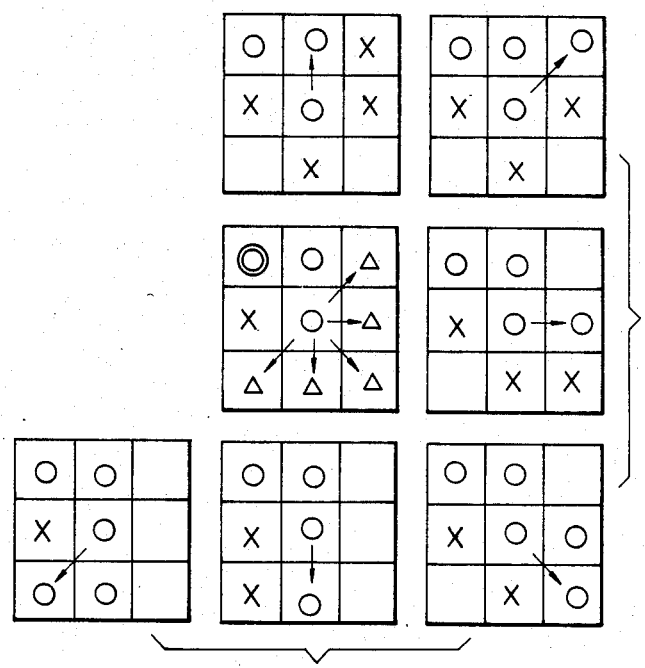
Figure 16E:
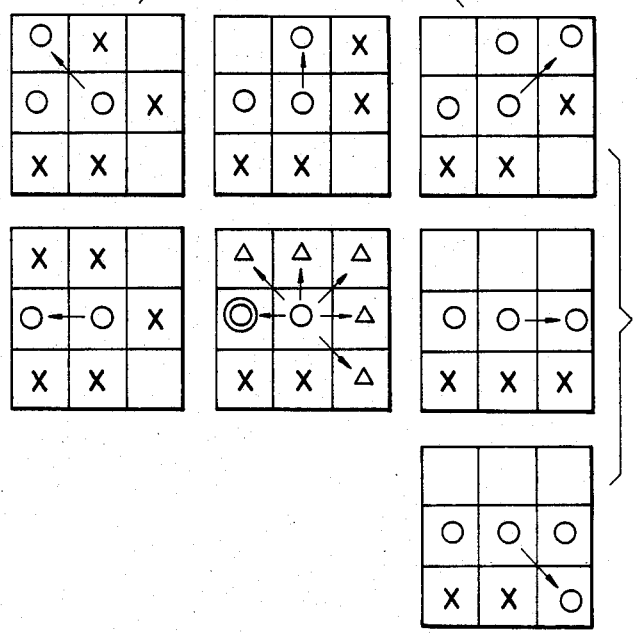
Figure 16F:
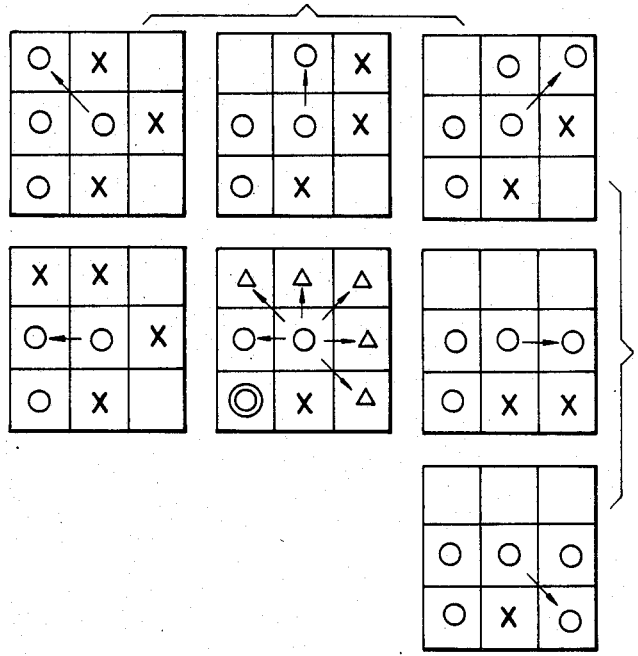
Figure 16G:
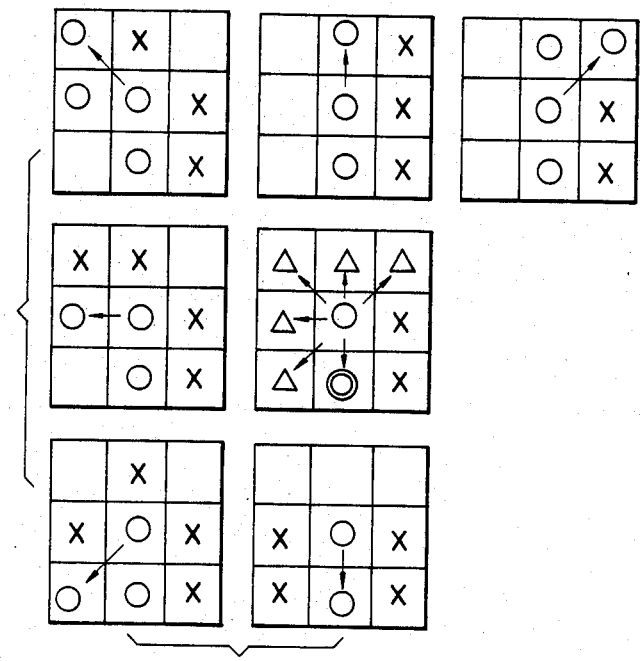
Figure 16H:
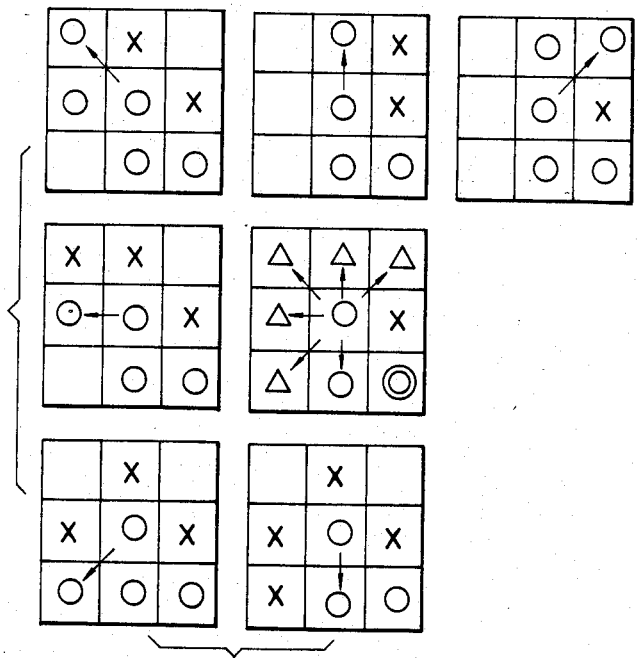

To determine a first detection subject picture element in an image area, the boundary of which is to be detected, the image data is searched, for instance from the left bottom of the image, and a picture element is selected, the data of which is non-coincident, when it is the center picture element ⑧, with the data of four picture elements ④ to ⑦ among the eight closest picture elements, as shown in FIG. 15.

The direction detection output with respect to this first detection subject picture element is either one of three data $D_0$ [→], $D_1$ [↗] and $D_2$ [↑], and is determined absolutely by the contents of the image data Δ of the picture elements ① to ②, as shown in FIG. 15.

In the state where the detection of the boundary direction is being done by following the boundary, whether the data of three of eight closest picture elements is coincident or non-coincident with the data of the center picture element ⑧ as determined in the previous detection operation has already been determined, and the direction detection output is determined absolutely by the image data Δ of the other five closest picture elements according to the position of the previous detection subject picture element as shown in FIGS. 16(A) to 16(H). In FIGS. 16(A) to 16(H) the double circle mark indicates the previous detection subject picture element.

In the direction ROM 240, direction data $D_0$ to $D_7$ are written in advance, which have been determined absolutely by the coincidence detection data for the image data of the eight picture elements ⓪, ①  ... ⑦ closest to the center picture element ⑧ and previous boundary detection output or direction data. The direction data $D_0$ to $D_7$ are read out as boundary detection output with the coincidence detection output data and previous direction data as read address data.

As has been shown, in this embodiment the boundary detection output is obtained by reading out direction data having been written in advance in a direction ROM 240A according to the output data of the comparator 230. In this case, the boundary detection processing can be executed in 1 to 3 μsec., which is very short compared to a processing time of several tens of μsec. that is required in case of a conventional 16-bit microcomputer.

Figure 17:
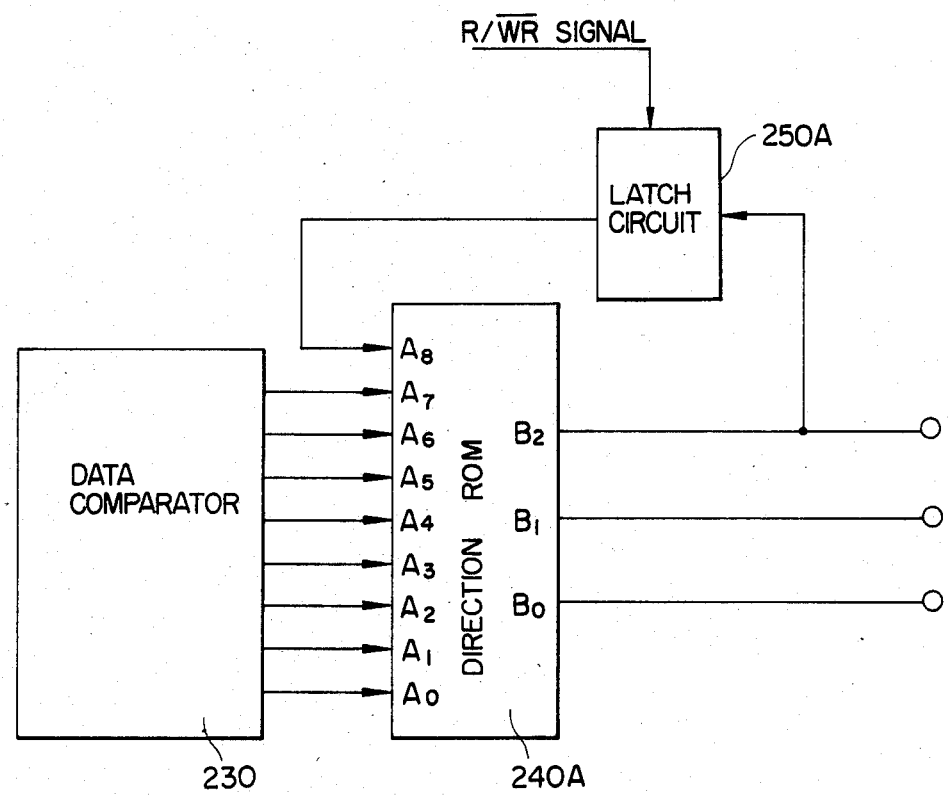

In the boundary detection circuit, the level of the boundary detection can be varied by supplying detection level data to the data bus through the three-state interface circuit 205, which is held enabled while the R/$\overline{WR}$ signal is logic "0" representing the write period TWR. In the above case, all the bits of the direction data read out from the direction ROM 240 through the latch circuit 250 have been used as address data for the direction ROM 240. However, it is possible to use an arrangement as shown in FIG. 17, in which only the most significant bit data $B_2$ of the direction data D read out from the direction ROM 240A is fed back as address data through the latch circuit 250A to the direction ROM 240A.

When sequentially detecting the direction of continuity of the boundary noted above, where the data of three among eight picture elements ⑧ closest to the prevailing center picture element ⑧ is coincident or non-coincident has already been determined by the result of the previous detection operation, that is, the three-bit portion of the output data of the comparator 230 has already been determined as shown in Table 1.

TABLE 1

| Previous detection subject picture element position | Detection output direction data $D_4[B_0,B_1,B_2]$ | \multicolumn{8}{c}{Prevailing comparator output data} |
|---|---|---|---|---|---|---|---|---|---|
| | | $A_7$ | $A_6$ | $A_5$ | $A_4$ | $A_3$ | $A_2$ | $A_1$ | $A_0$ |
| ⓪ | $D_4[0, 0, 1]$ | | | | | | 0 | 0 | 1 |
| ① | $D_5[1, 0, 1]$ | | | | | | 0 | 1 | 1 |
| ② | $D_6[0, 1, 1]$ | | | | | 0 | 0 | 1 | |
| ③ | $D_7[1, 1, 1]$ | | | | | 0 | 1 | 1 | |
| ④ | $D_0[0, 0, 0]$ | | | | 0 | 0 | 1 | | |
| ⑤ | $D_1[1, 0, 0]$ | | | | 0 | 1 | 1 | | |
| ⑥ | $D_2[0, 1, 0]$ | | | 0 | 1 | | | | 0 |

TABLE 1-continued

| Previous detection subject picture element position | Detection output direction data $D_4[B_0,B_1,B_2]$ | \multicolumn{8}{c}{Prevailing comparator output data} |
|---|---|---|---|---|---|---|---|---|---|
| | | $A_7$ | $A_6$ | $A_5$ | $A_4$ | $A_3$ | $A_2$ | $A_1$ | $A_0$ |
| ⑦ | $D_3[1, 1, 0]$ | 1 | 1 | | | | | | 0 |

0: Non-coincident
1: Coincident

Figure 18A:
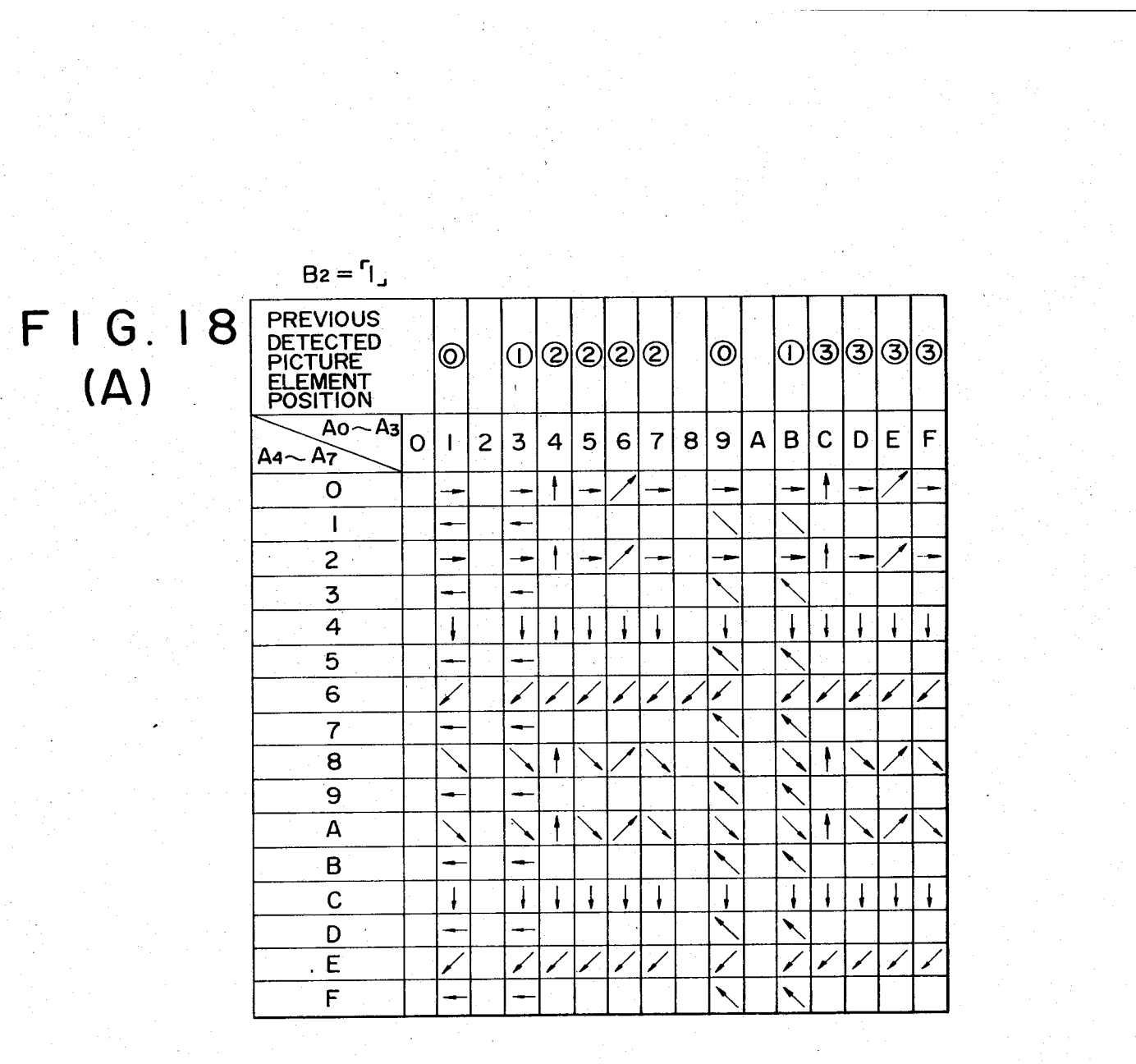
Figure 18B:
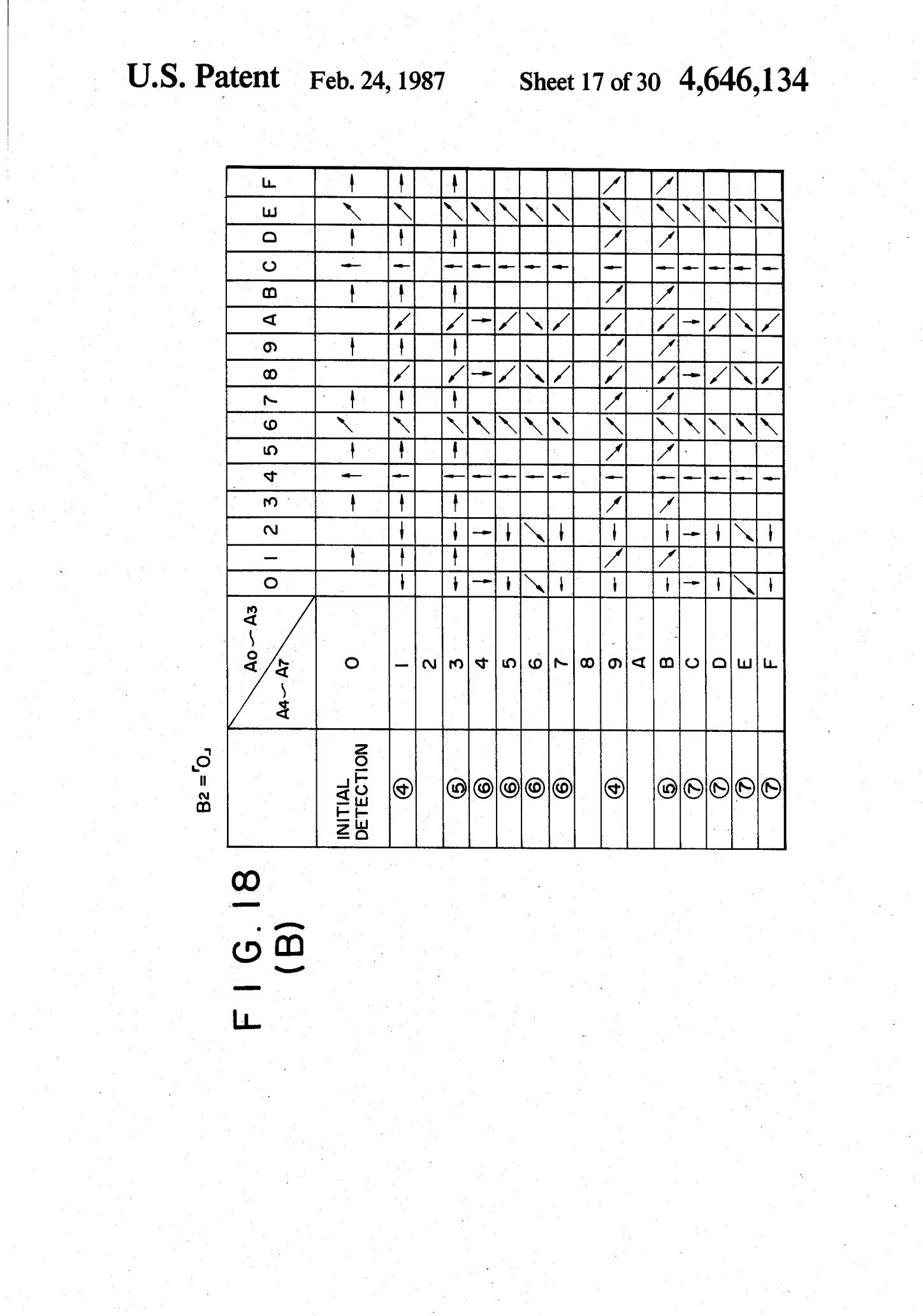

In the Table, the bit data enclosed in bold frames have different contents. Thus, by specifying with the data of the most significant data $B_2$ of the previous direction data D that the position of the previous detection subject picture element is either the position of one of the picture elements ⓪ to ③ or the position of one of the picture elements ④ to ⑦ with respect to the prevailing center picture element ⑧, all the direction data can be determined according to the output data $A_0$ to $A_7$ of the comparator 230. In this case, direction data as shown in FIG. 18 may be preliminarily stored in the direction ROM 240A.

With only a single bit $B_2$ of direction data D fed back as address data for the reading of the direction data, it is possible to reduce the storage capacity of the direction ROM 240A and simplify the latch circuit 250A.

Figure 19:
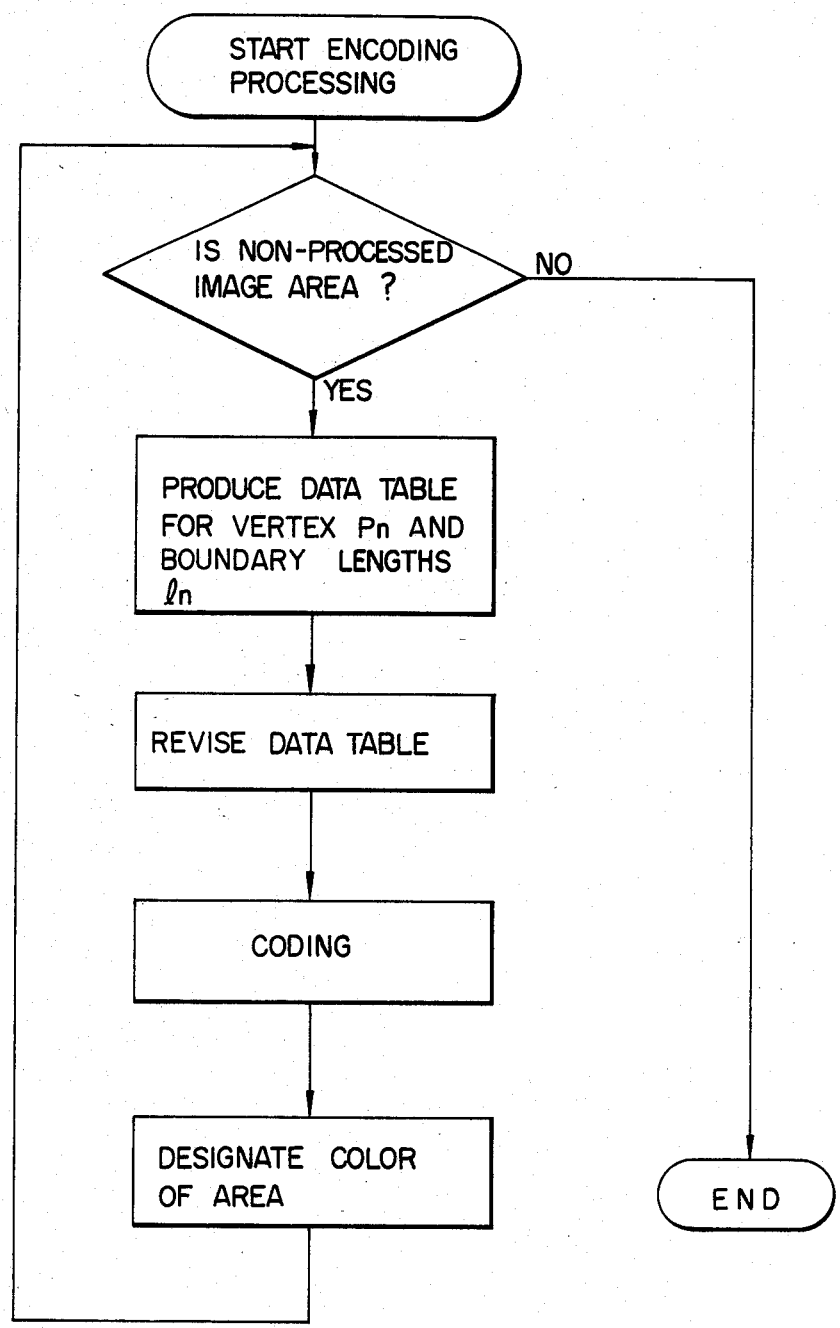
FIG. 19 is a flow chart illustrating an encoding processing routine in the above embodiment.

The encoding processing to obtain the geometric command data is done in a manner as shown in the flow chart of FIG. 19, in which the geometric command data expressing each of geometric areas of the image represented by various processed color image data noted above is produced.

Figure 20:
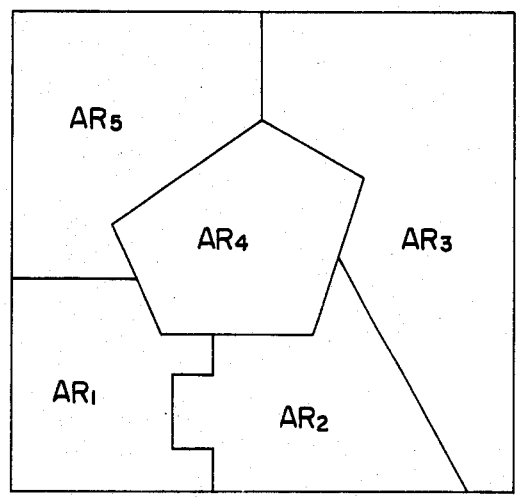

The encoding processing will now be described in conjunction with a case of converting an original image consisting of geometrical image areas $AR_1$ to $AR_5$ as shown in FIG. 20 to the geometric command data.

Figure 21:
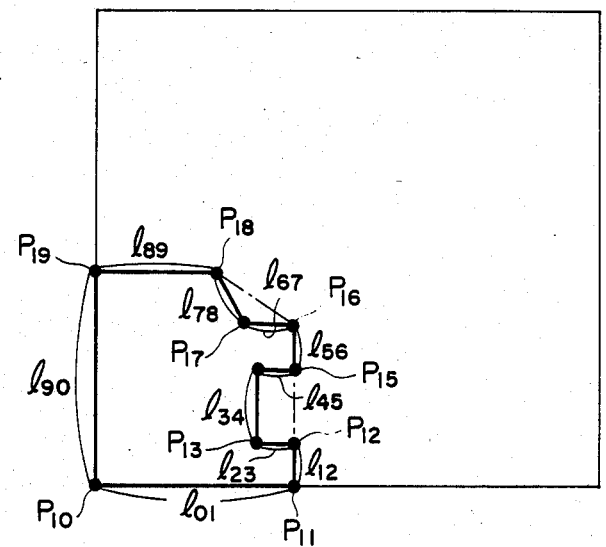

When the encoding processing is started, the various processed color image data noted above are retrieved from the left bottom of the corresponding image to find out an unencoded image area. When the unencoded image area is found out, a data table of vertexes of the geometrical contour drawn by the boundary of the area and the length of the boundary segments is produced by following the boundary. With the original image as shown in FIG. 20, the first image area $AR_1$ is first detected as shown in FIG. 21, and a data table of the vertexes $P_{10}$ to $P_{19}$ and lengths $l_{10}$ to $l_{90}$ of the boundary segments between adjacent vertexes is produced.

Then, the data table is revised to one for the image area which results from the omission of any pair of vertexes which can be connected by a line segment which does not pass through the own area and/or any encoded area but passes through on other unencoded area or areas. More specifically, in the instant case the data table is revised to one consisting of data of vertexes $P_{10}$, $P_{11}$, $P_{16}$, $P_{18}$ and $P_{19}$ and boundary segment lengths $l_{01}$, $l_{16}$, $l_{68}$, $l_{89}$ and $l_{90}$, which data represents an encoded image area $AR_1$, as shown in FIG. 22A, in which the vertexes $P_{13}$ and $P_{14}$ between the vertexes $P_{12}$ and $P_{15}$ and vertex $P_{17}$ between the vertexes $P_{16}$ and $P_{18}$ are omitted. The vertexes $P_{12}$ and $P_{15}$ are also omitted because they no longer serve as geometric vertexes when they are connected by a line.

Subsequently, the data in the revised data table for the area $AR_1'$ resulting from the omission of the vertexes noted above is encoded to produce, for instance, data "POLYGON" in PDI codes.

Then, the color determined by the color processing described above is designated for the area $AR_1'$ by providing corresponding command data "CONTROL". In this way, the encoding for the first image area $AR_1$ is completed.

When the encoding for the first image area $AR_1$ is completed, the operation of detecting the unencoded area is performed again, and encoding for the second image area $AR_2$ is executed in the manner as described. Likewise, encoding is done for the following third to fifth image areas $AR_3$ to $AR_5$. When no unencoded area can be found any more, the encoding processing is completed. FIGS. 22(A) to 22(E) show revised areas $AR_1'$ to $AR_5'$ corresponding to the respective areas $AR_1$ to $AR_5$.

Figure 26:
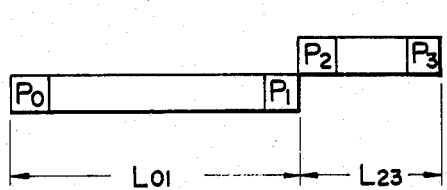
Figure 27A:
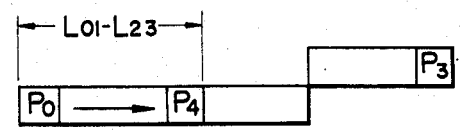
FIGS. 27(A) and 27(B) are views showing vertexes necessary for encoding the boundary shown in FIG. 26 and a data table therefor.
Figure 27B:
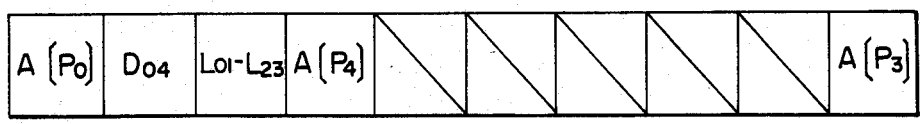
Figure 28:
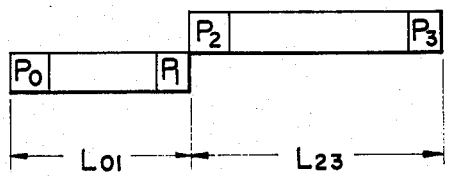
Figure 29A:
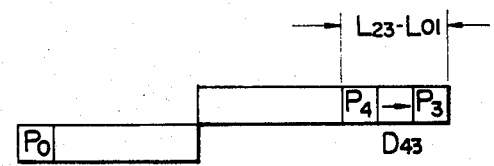
FIGS. 29(A) and 29(B) are views showing vertexes necessary for the encoding of the boundary shown in FIG. 28 and a data table therefor.
Figure 29B:
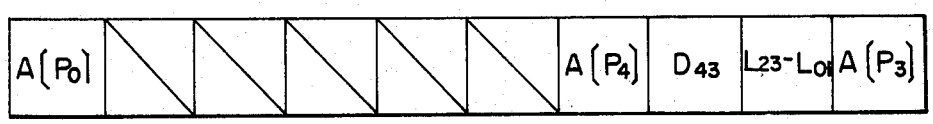
Figure 30A:
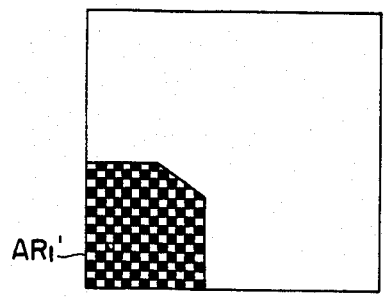
FIGS. 30(A) to 30(E) are schematic views for explaining the procedure of reproducing the original image shown in FIG. 7 according to the geometric command data obtained by encoding the original image in the above embodiment.
Figure 30B:
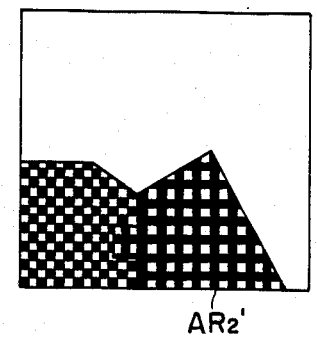
Figure 30C:
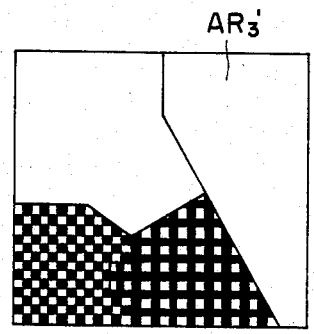
Figure 30D:
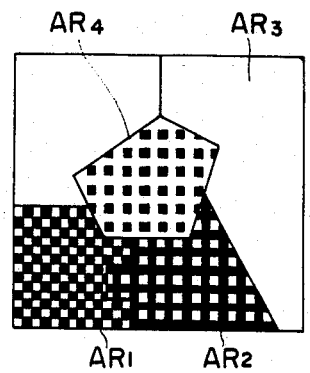
Figure 30E:
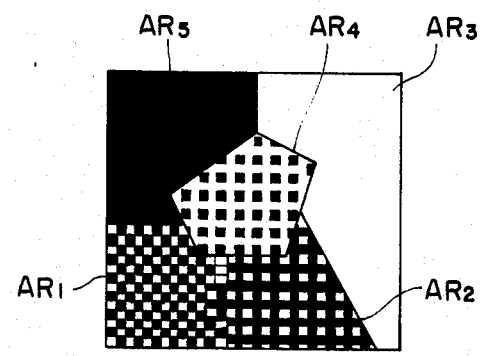

The boundary detection circuit as described above progressively provides direction data obtained by following the boundary as its detection output. Each vertex of the geometric contour shown by the boundary thus can be detected on the side of the microcomputer 100 through detection of the corresponding point of change in the direction data. The length ln of the boundary segment can be obtained from the number of times of repetition of the same direction data. More specifically, when the boundary of the image area as shown in, for instance, FIG. 23(A) is followed by the boundary detection circuit, the microcomputer 100 produces a data table as shown in FIG. 23(B), consisting of address data $A(P_0)$ to $A(P_3)$ for the respective vertexes $P_0$ to $P_3$, direction data $D_{01}$, $D_{12}$ and $D_{28}$ indicative of the direction of boundary segment connecting adjacent vertexes and length data $L_{01}$, $L_{12}$ and $L_{28}$ indicative of the length of the respective boundary segments.

Where intermediate vertexes $P_1$ and $P_2$ are deviated only by one picture element and the lengths $L_{01}$ and $L_{23}$ of the pertinent boundary segments are equal as shown in FIG. 24, the vertexes $P_1$ and $P_2$ may be omitted to produce a revised data table as shown in FIG. 25(B), which consists of the sole address data $A(P_0)$ and $A(P_3)$ of the opposite end vertexes $P_0$ and $P_1$. Generally, where the boundary of the image area is represented by image data corresponding to picture elements in a matrix array, a straight line segment which is continuous in a direction other than the directions of the rows and columns of the matrix is represented by a staircase-like line. Therefore, the boundary segment connecting the vertexes $P_1$ and $P_3$ are absolutely represented by the picture elements as shown in FIG. 25(A), so that the intermediate vertexes $P_1$ and $P_2$ may be omitted. Further, under the condition $L_{01} = L_{23}$, the intermediate vertexes $P_1$ and $P_2$ may be omitted. Therefore, for a boundary segment as shown in FIG. 26 a data table as shown in FIG. 27(B) may be produced by adding a vertex $P_4$ at the position of the picture element at a distance of $L_{01}-L_{23}$ from the position of the picture element $P_0$ and omitting the vertexes $P_1$ and $P_2$. Likewise, for a boundary segment as shown in FIG. 28 a data table as shown in FIG. 29(B) may be produced.

In the above embodiment, an original image as shown in FIG. 20 is handled as an aggregate of geometric areas $AR_1$ to $AR_5$, and corresponding revised geometric areas $AR_1'$ to $AR_5'$ as shown in FIGS. 22(A) to 22(E) are successively converted to geometric command data. Thus, on the receiving side receiving the geometric command data the original image can be reproduced by successively combining the geometric areas $AR_1'$ to $AR_5'$ reproduced according to the received geometric command data in the manner as shown in FIGS. 30(A) through 30(E). The geometric command data which is obtained by successively encoding the revised areas $AR_1'$ to $AR_5'$ noted above, has reduced code length because the number of vertexes involved is reduced in the stage of determining the revised areas, so that the conversion efficiency and transmission efficiency can be extremely improved.

To produce the geometric command data based on the PDI codes, it is possible to use not only commands "POLYGON" but also other commands such as "INCREMENTAL POLYGON" so as to selectively provide command data of shorter code lengths.

In the above embodiment, the color image for one frame has been automatically encoded into the geometric command data. However, when sequentially transmitting image with frame correlation, only changes in image areas may be converted to the geometrical command data.

In the manual editing processing, a color of an image area may be changed using an area processor.

Figure 31:
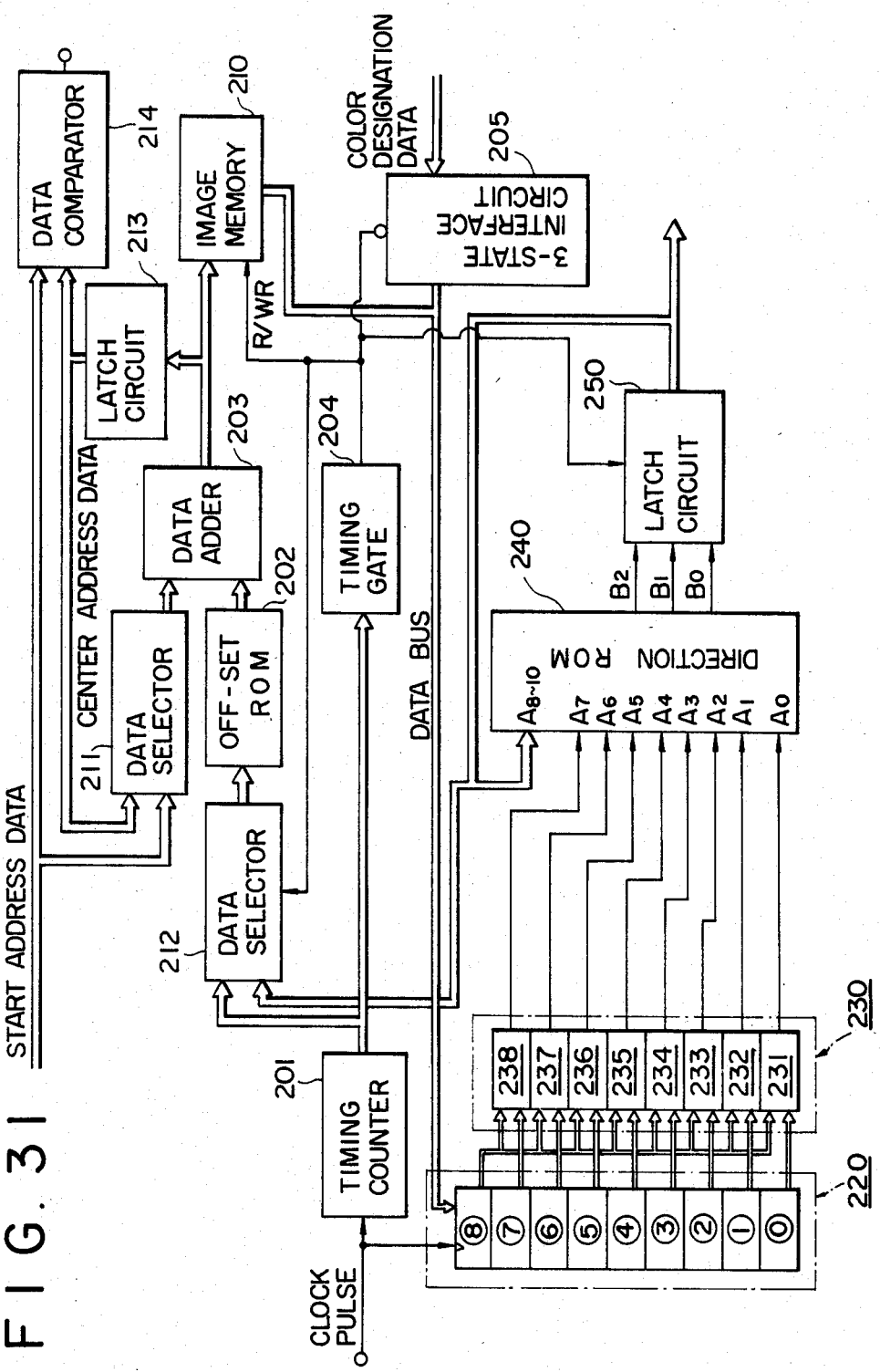
Figure 32:
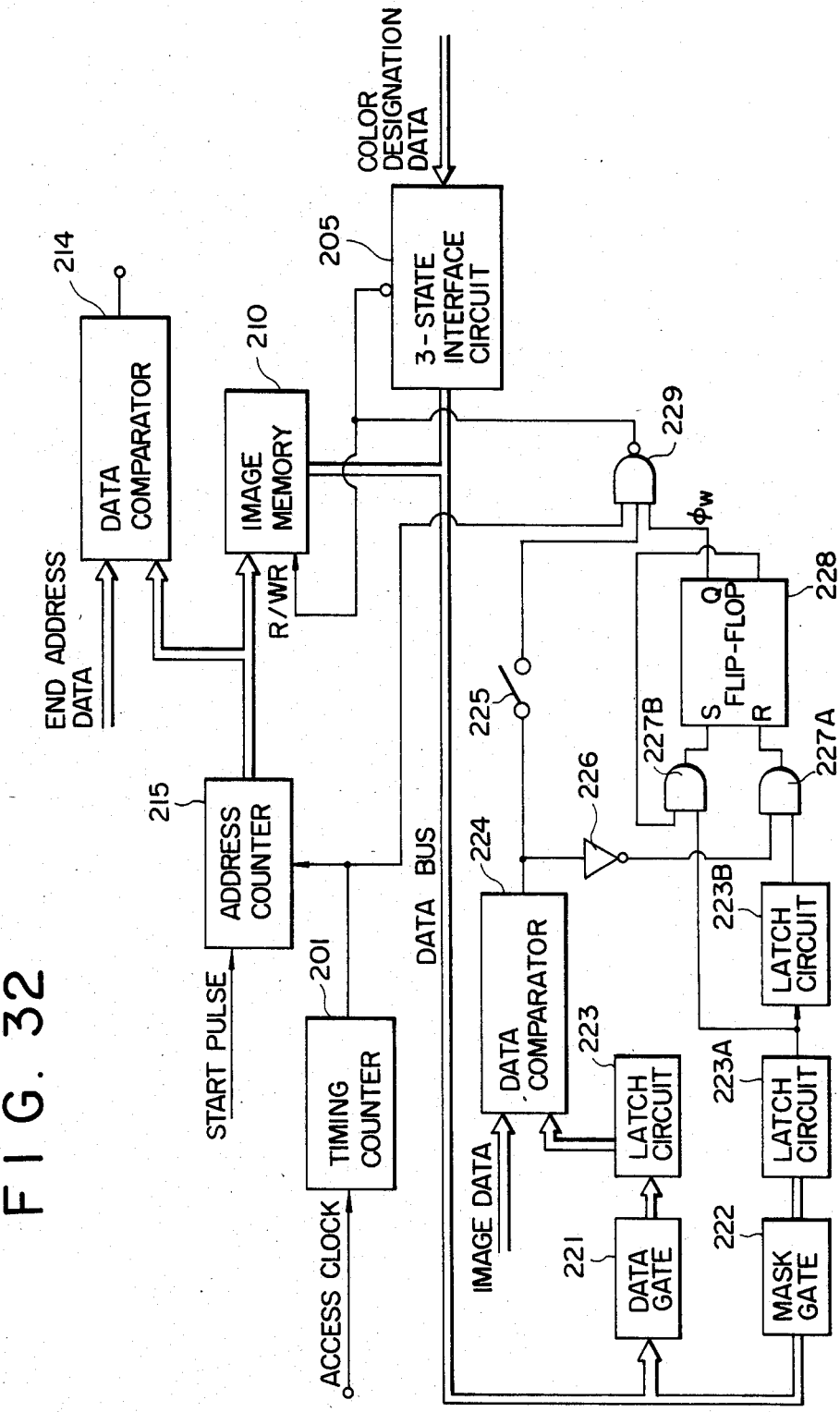

Such an area processor is provided in the high speed operational circuit 200, and it consists of a boundary processing unit as shown in FIG. 31, which utilizes the boundary detection circuit as described before, and an area processing unit as shown in FIG. 32, which executes an area processing after boundary processing in the boundary processing unit.

In the boundary processing unit shown in FIG. 31, start address data representing a start point on the boundary of an area as a subject of processing is supplied as data specifying the subject area from the microcomputer 100 through a first data selector 211 to a data adder 203 in the boundary detection circuit noted before. Also, image data designating the new color of the subject area is supplied to the three-state interface circuit 205.

A second data selector 212 selects the count output of the timing counter 201 and output of the latch circuit 250, i.e., direction data, to be supplied as address data to an off-set ROM 202. The first data selector 211 selects the start address data supplied from the microcomputer 100, and sum data of the data adder 203 supplied as output data of a latch circuit 213, the selected data being supplied as center address data to the data adder 203. A data comparator 214 compares the start address data from the microcomputer 100 and output data from the latch circuit 213.

The second data selector 212 is controlled such that it addresses the off-set ROM 202 according to the direction data of the direction ROM 240 that is provided through the latch circuit 250 during the write period $T_{WR}$ noted above under the control of the output of the timing gate 204. The first data selector 211 is controlled to feed the output data of the latch circuit 213 latching the sum data of the data adder 203 back to the data adder 203 for a period other than the period, during which the start address data from the microcomputer 100 is fetched by the data adder 203.

In the boundary processing unit of the above construction, when the start address data and image data designating the subject area and new color thereof, are supplied from the microcomputer 100, the boundary detection is started with the picture element designated by the start address data as center picture element. The data adder 203 adds the off-set data, which is obtained as the off-set ROM 202 is addressed sequentially by the boundary detection data, i.e., output of the direction ROM 240 supplied after being latched in the latch circuit 250, and the start address data noted above, thus obtaining the center address data for the next detection operation, the center address data being latched in the latch circuit 213. The boundary detection operation is executed with respect to the center picture element designated by the center address data latched in the latch circuit 213, whereby the image data corresponding to each center picture element is replaced with the new image data while following the boundary of the subject area. The following of the boundary is continued until the start address data supplied to the data comparator 214 and center address data latched in the latch circuit 213 coincide. When the two data coincide, the boundary processing is completed.

When the boundary processing is over, the microcomputer 100 receives a coincidence output indicative of the completion of the boundary processing provided from the data comparator 214, and switches the boundary processing unit over to the area processing unit of FIG. 32 in the high speed operational circuit 200.

In the area processing unit, an address counter 215 is connected to an address bus leading to the image memory 210, in which new color image data is stored in place of boundary image data through the boundary processing described above. All the addresses of the image memory are thus sequentially accessed by the address counter 215, and image data thus read out from the image memory 210 is supplied to a data gate 221 and mask gate 222 via a data bus.

The address counter 215 produces the address data by counting a timing clock, which is provided from the timing counter 201 and having one half the clock frequency of an access clock input to the timing counter 201. The timing clock from the timing counter 201 is also supplied to an NAND gate 229 and hence supplied as a control pulse to the three-state interface circuit 205 and also as an R/WR (write/read control) signal to the image memory 210.

Figure 33:
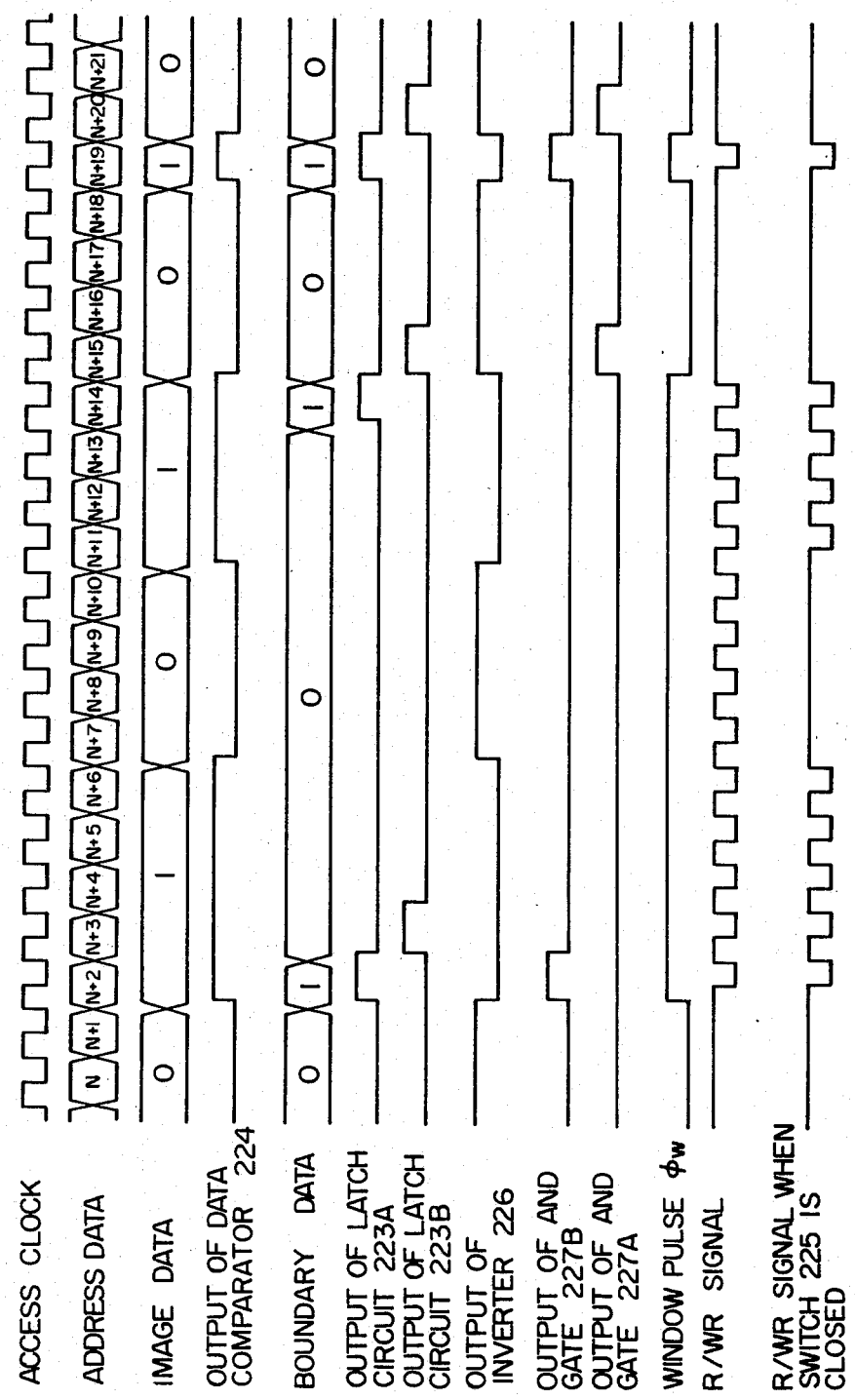

The data gate 221 supplies the image data read out from the image memory 210 through a latch circuit 223 to a data comparator 224. To the data comparator 224 is supplied from the microcomputer 100 image data indicative of the color of the subject area. The data comparator 224 compares the image data read out from the image memory 210 and image data supplied from the microcomputer 100, thereby effecting a check as to whether the prevailing data being dealt with is of the subject area, and it supplies a coincidence output as shown in FIG. 33, for instance, indicative of the fact that the prevailing data is of the subject area, through a switch 225 to the NAND gate 229. The coincidence output is also supplied through an inverter 226 to a first AND gate 227A, that is, to the first AND gate 227A is supplied a non-coincidence output having a meaning that the prevailing data is not of the subject area.

The mask gate 222 derives, from the image data read out from the image memory 210, the data obtained through the boundary processing noted above, the extracted image data being supplied to a first latch circuit 223A and hence to a second latch circuit 223B and also to a second AND gate 227B. The output of the second latch circuit 223B is supplied to the first AND gate 227A.

The output of the first AND gate 227A is supplied to a reset terminal of R-S flip-flop 228. The output of the second AND gate 227B is supplied to a set terminal of the R-S flip-flop 228. The flip-flop 228 supplies its negation output to the second AND gate 227B and also supplies its affirmation output as a window pulse signal $\phi_\omega$ to the NAND gate 229.

In the area processing unit of the above construction, when an area processing start pulse is supplied from the microcomputer 100 to the address counter 215, the image data of the subject area is successively read out from the image memory 210 according to address data from the address counter 215. As a result, the mask gate 222 detects boundary data indicative of the position of the boundary of the subject area, whereupon the flip-flop 228 is set. Subsequently, the data comparator 224 determines that the image data is not of the subject area, whereupon the flip-flop 228 is reset by the boundary data. The flip-flop 228 thus produces a window pulse $\phi_\omega$ corresponding to image data in the subject area belonging to one horizontal line. The NAND gate 229, which is gate controlled by the window pulse output of the flip-flop 228, passes only timing clock at timings corresponding to the image data of the subject area. The operation control of the three-state interface circuit 205 and the write/read control of the image memory 210 for every scanning line are effected according to the output of the NAND gate 229, whereby the image data of the subject area is replaced with new color image data supplied to the three-state interface circuit 205.

The window pulse signal $\phi_\omega$ provided from the flip-flop 228 is for one horizontal line over the entire area even in case of a subject area ARs which contains an enclosed other area ARo as shown in FIG. 34. To preclude data of the other area ARo, the switch 225 is closed to supply the coincidence output from the data comparator 224 to the NAND gate 229 for gate controlling the NAND gate according to the coincidence output noted above and window pulse signal $\phi_\omega$. The operation of the switch 225 thus selectively permits the processing with respect to the entire area enclosed by the boundary of the subject area determined by the boundary processing described before and processing with respect to the area exclusive of the enclosed other area.

The start address data supplied to the boundary processing unit shown in FIG. 31, can be obtained by merely designating any position in the subject area by making use of the tablet 94 noted above if a start address detection circuit as shown in FIG. 35, for instance, is provided in the high speed operational circuit 200.

Figure 36A:
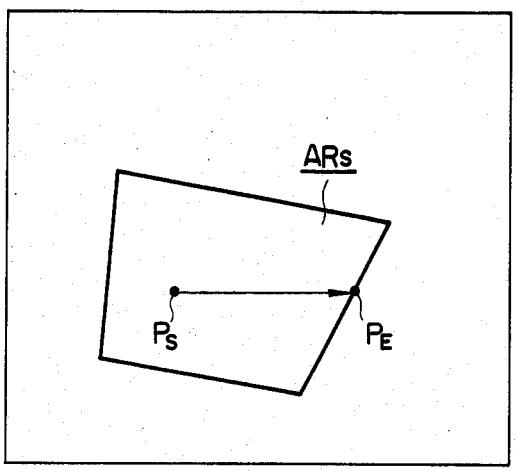
FIGS. 36(A) and 36(B) are views showing embodiments of an image area as a subject of processing for explaining the operation of the start address detection circuit.
Figure 36B:
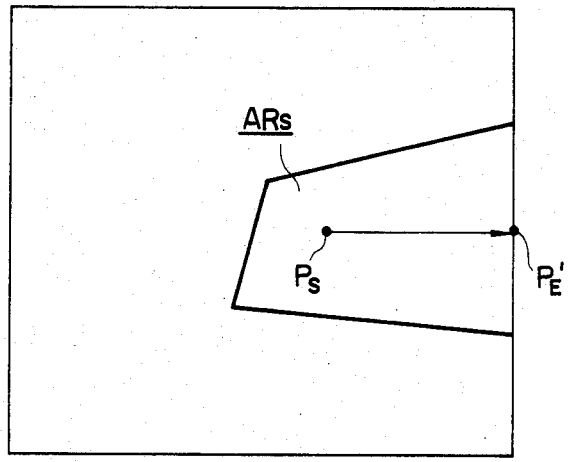

In the start address detection circuit shown in FIG. 35, initial address data designating a point in the subject area as provided by the tablet 94 is set in X- and Y- address counters 215X and 215Y. The address counters 215X and 215Y count clock pulses supplied from an AND gate 241 which is gate controlled according to the output of a flip-flop triggered by an address detection start pulse. Image data that is read out from the image memory 210 as the memory 210 is accessed by the address counters 215X and 215Y, is supplied to a data comparator 242 both directly and through a latch circuit 243. The data comparator 242 compares the prevailing data and data of the preceding picture element and thus decides whether the data is of a boundary. The resultant output of the data comparator 242 is supplied through an inverter 244 to a clear terminal of the flip-flop 246. When the output of the data comparator 242 is logic "0", i.e., when a boundary is detected, the flip-flop 246 is cleared to disable the AND gate 241, thus bringing an end to the address detection. A carry output of the X-address counter 215X is supplied through the OR gate 241 to the clear terminal of the flip-flop 246. If no boundary is detected until the end of a horizontal scanning line, the X-address counter 215X is cleared by the carry output noted above to disable the AND gate 241, thus bringing an end to the address detection operation. The contents of the address counters 215X and 215Y at the time of the end of the address detection operation, are provided as the start address data through a latch circuit 213. When initial data representing a position Ps in a subject area ARs enclosed by a boundary as shown in FIG. 36(A) is given to the start address detection circuit, the latch circuit 213 provides start address data representing the boundary position $P_E$ on the horizontal line passing through the point $P_S$. When the subject area ARs is found adjacent to a right side of the entire image as shown in FIG. 36(B), the latch circuit 213 provides start address data representing the end $P_E'$ of a horizontal line passing through the point $P_S$ represented by the initial address data noted above.

Figure 37:
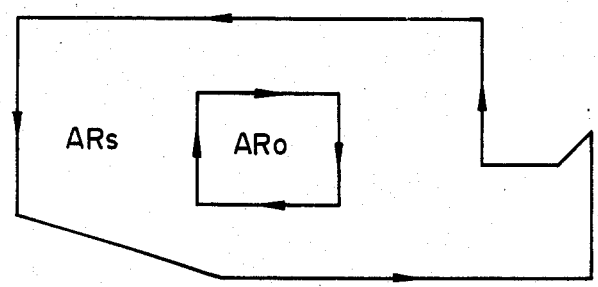

In the case of the subject area ARs shown in FIG. 34, which contains the enclosed other area ARo, it is liable to detect the boundary between the areas ARs and ARo. This boundary can be identified as such by detecting the fact that the detection operation by the boundary detection circuit noted above is done in the clockwise direction. More specifically, the boundary detection circuit noted above effects the detection operation by designating the eight picture elements closest to the subject picture element in the counterclockwise direction. This means that the boundary between the subject area ARs and enclosed other area ARo is detected progressively in the clockwise direction as shown in FIG. 37. The judgement as to whether the detection operation by the boundary detection circuit is done in the counterclockwise or clockwise direction, may be done using a judgement circuit as shown in FIG. 38.

Figure 38:
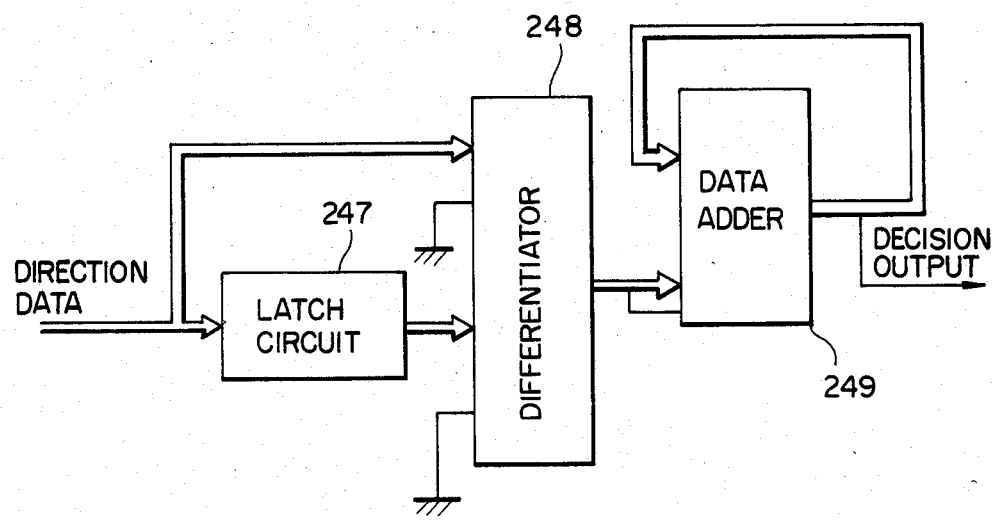

In the judgement circuit shown in FIG. 38, the detection output of the boundary detection circuit, i.e., direction data, is supplied to a differentiator 248 both directly and through a latch circuit 247. The differential data obtained from the differentiator 248 is accumulated by a data adder 249. The data adder 249 accumulates the differential data until one closed loop boundary is detected by the boundary detection circuit. The most significant bit of the output of the data adder 249 is logic "0" when the detection operation by the boundary detection circuit is being done in the counterclockwise direction, while it is logic "1" when the detection operation is being done in the clockwise direction. Thus, the boundary data representing the boundary between the two areas ARs and ARo can be designated according to the output of the judgement circuit. Thus, it is possible to detect the boundary concerning any subject area accurately through combined operation of boundary detection and detection operation direction judgement. Further, by utilizing the judgement circuit noted above it is possible to obtain area processing with respect to the enclosed other area ARo in the subject area ARs.

As has been shown, with the boundary processing unit as described above according to the present invention, the boundary of an area of an image to be transmitted can be detected accurately and at a high speed by reading out from memory means the direction data which is determined absolutely by the coincidence detection output data for the image data with respect to the data of a subject picture element of the data of eight picture elements closest thereto. Thus it is possible to provide an image signal encoding apparatus which is suited for the input image processing in a digital image information transmitting system.

As has been shown, with the image signal encoding apparatus according to the present invention an original image represented by input image data stored in the image memory means is handled as an aggregate of geometric image areas, and each image area is revised by omitting any vertex present between a pair of vertexes which can be connected by a line passing through unencoded image area or areas alone, the revised image area being encoded to obtain corresponding geometric command data. Thus the number of vertexes and the overall length of the boundary of the subject image area can be reduced to increase the efficiency of the encoding processing. Thus, according to the present invention geometric command data of each image area can be produced from the input image data automatically, accurately and in a short period of time.

Figure 39:
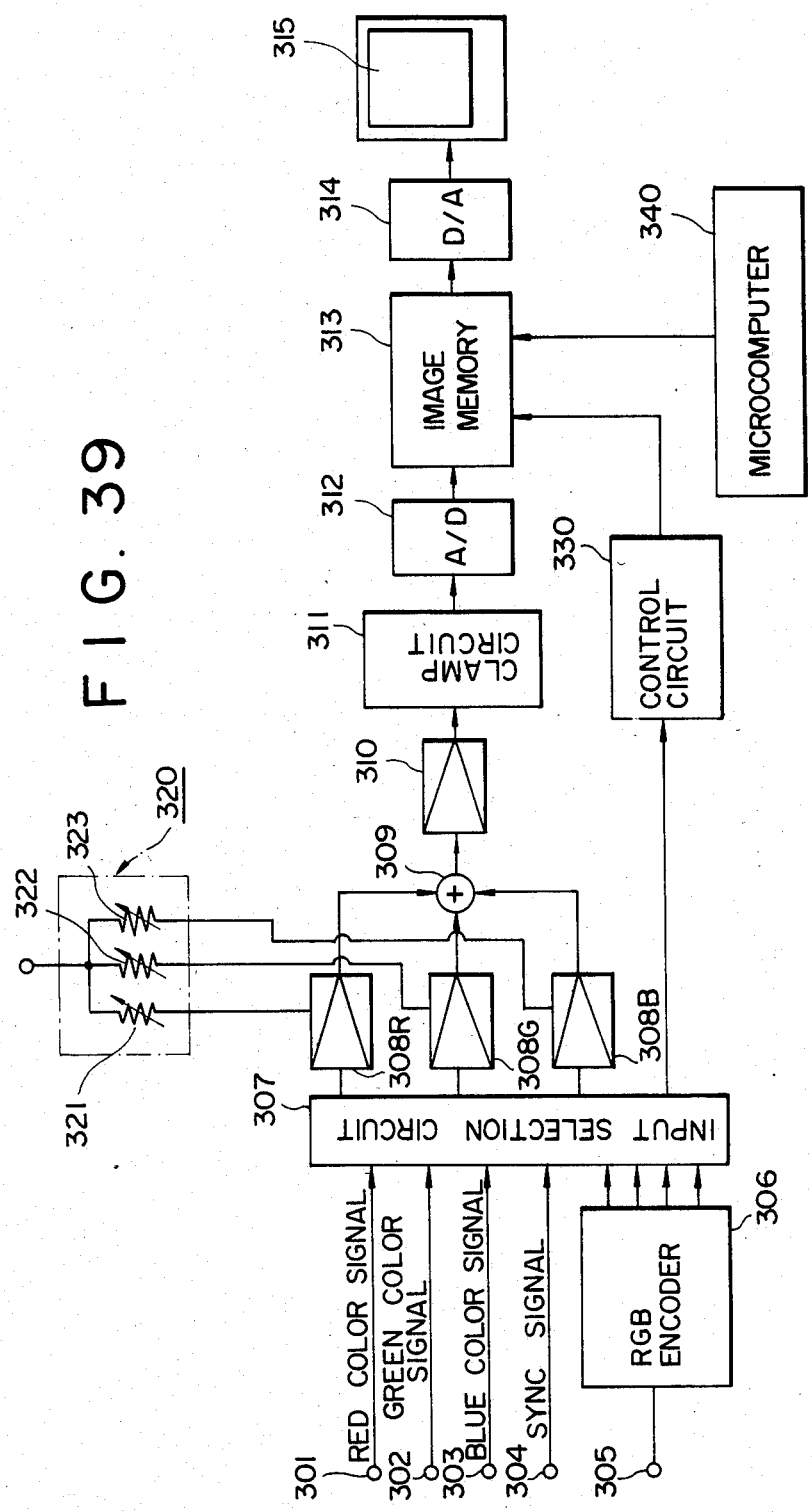
FIG. 39 is a block diagram showing an embodiment of the image area determination unit.

FIG. 39 shows an area determination unit for determining an image area of an input color image in an NAPLPS image input system.

In the unit shown in FIG. 39, either three primary color signals and a synchronizing signal therefor obtained from an original image through a video camera or a standard color television signal, i.e., an NTSC color television signal, is supplied as a processed video signal of the original image. The three primary color signals and sync signal are supplied through first to fourth signal input terminals 301 to 304 to an input selection circuit 307, while the color television signal is supplied through a fifth signal input terminal 305 to an RGB encoder 306. The RGB encoder 306 encodes the input signal to obtain the three primary color signals and also separates the sync signal, these signals being supplied to the input selection circuit 307.

The input selection circuit 307 selects the three primary color signals $E_R$, $E_G$ and $E_B$ and sync signal Sync that are supplied either from the first to fourth signal input terminals 301 to 304 or from the RGB encoder 306. The three primary color signals $E_R$, $E_G$ and $E_B$ selected by the input selection circuit 307 are supplied through respective variable gain amplifiers 308R, 308G and 308B to a mixer 309. The sync signal, on the other hand, is supplied to a control circuit 330.

The gains of the variable gain amplifiers 308R, 308G and 308B by respective gain controllers 321 to 323 provided on a consol panel 320. The mixer 309 mixes the input three primary color signals in ratios determined by the gain ratios of the variable gain amplifiers 308R, 308G and 308B and supplies the resultant signal as an image area determination signal.

The image area determination signal obtained from the mixer 309 is amplified by an amplifier 310 to a suitable amplitude and then supplied to a clamp circuit 311, in which the black level is fixed. The output of the clamp circuit 311 is supplied to an A/D converter 312 for quantization. The quantized data obtained in the A/D converter 312 from the image area determination signal, is written in an image memory 313 to be supplied to a D/A converter 314 to be converted to recover the video signal which is supplied to a monitor television receiver 315. Thus, the image area represented by the image area determination signal can be monitored on the monitor television receiver 315.

The writing and reading of data into and out of the image memory 313 is controlled by a microcomputer 340 according to address data produced from the control circuit 330 according to the sync signal Sync. The microcomputer 340 also executes processing such as encoding on the data in the image memory 313.

In this embodiment, the ratios of the three primary color signals forming the image area determination signal can be variably set by operating the gain controllers 321 to 323 provided on the consol panel 320, so that it is possible to make fine adjustment of a boundary portion of an image area according to the image area determination signal with respect to any given color image area of the original image. Further, since the image area represented by the image area determination signal can be monitored on the monitor television receiver 315, the operator can set the ratios of the three primary color signals to desired values while watching the monitor television receiver 315, so that it is possible to obtain more reliable area determination.

Further, for such processing as changing colors of individual areas of the original image represented by the three primary color signals $E_R$, $E_G$ and $E_B$, the image area determination data stored in the image memory 313 is used as reference data for the subject image area. For example, the three primary color signals $E_R$, $E_G$ and $E_B$ of the original image are directly quantized to be stored in an image memory (not shown), and individual data of the subject area are read out from the image memory with the image area determination data as reference data. Of the read-out data the average of the individual color components is calculated, and the average data is used to designate the color of the subject area.

What is claimed is:

1. An apparatus for encoding video data comprising
   (a) memory means for storing input video data having a plurality of image areas;
   (b) detector means for detecting each of said image areas;
   (c) means for encoding image areas detected by said detector means sequentially to geometric command data; and
   (d) means for detecting a pair of vertexes whose binding segment of a line is only in an unencoded area;
   wherein any other vertex in the encoded area between said pair of vertexes is ignored by said means for encoding when said pair of vertexes are detected.

2. An apparatus according to claim 1, wherein said digital data is divided into a plurality of areas and said signal processing means includes means for detecting a boundary of said area.

3. An apparatus according to claim 1, wherein said geometric command data is a NAPLPS code.

4. An apparatus according to claim 3, wherein said geometric command data is a command for describing a polygon.

5. An apparatus according to claim 1, further comprising input means for producing an image signal and signal processing means for converting said image signal into said input video data having a plurality of images.

6. An apparatus according to claim 5, wherein said signal processing means includes means for reducing the information amount of said image signal to obtain said digital data adequate for encoding.

7. An apparatus according to claim 5, wherein said input means includes a video camera.

8. An apparatus according to claim 7, wherein said detector means includes means for detecting an image area having the same characteristic of said image signal.

9. An apparatus according to claim 8, wherein said characteristic is the kind of color.

10. An apparatus for processing video data comprising:
    (a) first memory means for storing video data having an image area;
    (b) first detector means for detecting a direction of a boundary of said image;
    (c) second memory means for storing a boundary data of said image area; and
    (d) means for encoding said video data of each image area sequentially to geometric command data, wherein said first detector means includes second detector means for detecting whether the picture element read out from said first memory means is equal to each of the picture elements surrounding said picture element and determines said direction by the outputs of said second detector means and said second memory means, and further wherein said second detector means for determining said direction is incorporated with said second memory means.

11. An apparatus according to claim 10, wherein said second memory means is an ROM and outputs said direction by regarding the output of said detector and the direction data read out just before from said second memory means as reading addresses thereof.

12. An apparatus according to claim 10, wherein it further comprises means for replacing said video data by another video data.

13. An apparatus according to claim 12, wherein said another video data has a different color from said video data to be replaced.

* * * * *